(12) United States Patent
Xia

(10) Patent No.: US 11,493,658 B2
(45) Date of Patent: Nov. 8, 2022

(54) COMPUTER-IMPLEMENTED METHOD AND SYSTEM EMPLOYING NONLINEAR DIRECT PRESTACK SEISMIC INVERSION FOR POISSON IMPEDANCE

(71) Applicants: China Petroleum & Chemical Corporation, Beijing (CN); Sinopec Tech Houston, LLC, Houston, TX (US)

(72) Inventor: Fan Xia, Houston, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 449 days.

(21) Appl. No.: 16/701,714

(22) Filed: Dec. 3, 2019

(65) Prior Publication Data
US 2021/0165119 A1    Jun. 3, 2021

(51) Int. Cl.
*G01V 1/00* (2006.01)
*G01V 1/50* (2006.01)

(52) U.S. Cl.
CPC ........ *G01V 1/50* (2013.01); *G01V 2210/6222* (2013.01); *G01V 2210/6224* (2013.01);
(Continued)

(58) Field of Classification Search
None
See application file for complete search history.

(56) References Cited

U.S. PATENT DOCUMENTS 5,583,825 A    12/1996 Carrazzone
6,058,073 A    5/2000 Verwest
(Continued)

FOREIGN PATENT DOCUMENTS

CN    108398720 A    8/2018
CN    108572389 A    9/2018

OTHER PUBLICATIONS

Xia, Fan et al.; "Constraints guided basis pursuit prestack AVA inversion"; SEG Internationa Exposition and Annual Meeting; Sep. 30, 2019, pp. 585-588.
(Continued)

*Primary Examiner* — James R Hulka
(74) *Attorney, Agent, or Firm* — Novick, Kim & Lee, PLLC; Allen Xue

(57) ABSTRACT

A computer-implemented method, and system implementing the method, are disclosed for computing a final model of elastic properties, using nonlinear direct prestack seismic inversion for Poisson impedance. User inputs and earth-model data is obtained over points of incidence of a survey region, at various angles of incidence. Various models are then computed that serve for lithology identification and fluid discrimination and take part in preliminary seismic exploration and reservoir characterization. Therefore, further refinement of these models is required due to changes in burial depths, compaction and overburden pressure, as they provide limitations for reservoirs on porous media. The further refinement using nonlinear direct prestack seismic model is performed on a system computer, which produces a final model of elastic properties. This model can then be applied for lithology prediction and fluid detection to identify potential targets of oil and gas exploration and estimating spots in unconventional shale gas applications.

16 Claims, 12 Drawing Sheets

(52) U.S. Cl.
CPC ............... *G01V 2210/6226* (2013.01); *G01V 2210/6242* (2013.01); *G01V 2210/632* (2013.01); *G01V 2210/66* (2013.01); *G01V 2210/67* (2013.01)

(56) References Cited

U.S. PATENT DOCUMENTS

| | | | |
|---|---|---|---|
| 6,611,764 | B2 | 8/2003 | Zhang |
| 6,735,527 | B1 | 5/2004 | Levin |
| 8,923,094 | B2 * | 12/2014 | Jing ................. G01V 11/00 703/2 |
| 2003/0021184 | A1 * | 1/2003 | Zhang ................ G01V 1/303 702/14 |
| 2010/0312534 | A1 * | 12/2010 | Xu ................... G01V 1/50 703/2 |
| 2011/0255371 | A1 * | 10/2011 | Jing ................. G01V 1/288 367/73 |
| 2017/0192118 | A1 * | 7/2017 | Du .................. G01V 1/282 |
| 2018/0156932 | A1 * | 6/2018 | Sain ................. G01V 11/00 |
| 2018/0275303 | A1 * | 9/2018 | Zhan ................. G01V 1/303 |

OTHER PUBLICATIONS

Zong, Z Y et al.; "Reflection coefficient equation and pre-stack seismic inversion with Young's modulus and Poisson ratio", Chinese Journal of Geophysics—Chinese Edition, vol. 55, No. 11, pp. 3786-3794, Nov. 2012, DOI: 10.6038, ISSN: 0001-5733.
Smith, G., and Gidlow, P.; "Weighted stacking for rock property estimation and detection of gas: Geophysical Prospecting" (1987).
Goodway, B., T. Chen, and J. Downton; "Improved AVO fluid detection and lithology discrimination using Lamé petrophysical parameters: λρ, μρ. & λ/μ fluid stack from P and S inversions" (2005). 67th Annual International Meeting, SEG.
Quakenbush, M., B. Shang, and C. Tuttle; "Poisson impedance: The Leading Edge" (2006), v.25, No. 2, pp. 128-138.
Sharma, R., and S. Chopra; "Poisson impedance inversion for characterization of sandstone reservoirs" (2013). 83rd Annual International Meeting, SEG, Expanded Abstracts, pp. 2549-2553.
Russel, B.; "Prestack seismic amplitude analysis: an integrated overview: Interpretation" (2014), v.2, No. 2, SC19-SC36.
Zong, Z., X. Yin, and G. Wu; "Elastic impedance parameterization and inversion with Young's modulus and Poisson's ratio: Geophysics" (2013), 78, No. 6, N35-N42.
Wang, B., X. Yin, and F. Zhang; "Lamé parameters inversion based on elastic impedance and its application: Applied Geophysics" (2006), v. 3, pp. 120-123.
Bortfeld, R.; "Approximations to the reflection and transmission coefficients of plane longitudinal and transverse waves" (1961), Geophysical Prospecting, v. 9, No. 4, pp. 485-502.

Aki, K., and P. Richards; "Quantitative seismology: Theory and methods" (1980). W.H. Freeman and Co.
Shuey, R.; "A simplification of the Zoeppritz equations" (1985), Geophysics, v. 50, No. 4, pp. 609-614.
Fatti, J., G. Smith, P. Vail, P. Strauss, and P. Levitt; "Detection of gas in sandstone reservoirs using AVO analysis: A 3-D seismic case history using the geostack technique" (1994), Geophysics, v. 59, No. 9, pp. 1362-1376.
Wang, Y.; "Approximations to the Zoeppritz equations and their use in AVO analysis" (1999), Geophysics, v. 64, No. 6, pp. 1920-1927.
Stovas, A., and B. Ursin; "Second order approximations of the reflection and transmission coefficients between two viscoelastic isotropic media" (2001), The Journal of Seismic Exploration, v. 9, pp. 223-233.
Zhi, L., S. Chen, and X. Li; "Amplitude variation with angle inversion using the exact Zoeppritz equations—Theory and methodology" (2016), Geophysics, v. 81, No. 2, N1-N15.
Mallick, S.; "A simple approximation to the P-wave reflection coefficient and its implication in the inversion of amplitude variation with offset data" (1993), Geophysics, v. 58, No. 4, 544-552.
Xia, F., S. Zhao, W. Ding, and Y. Chen; "Constraints guided basis pursuit prestack AVA inversion" (2019), 89th Annual International Meeting, SEG, Expanded Abstracts, pp. 585-589.
Hamid, H., and A. Pidlisecky; "Multitrace impedance inversion with lateral constraints" (2015), Geophysics, v. 80, No. 6, M101-M111.
Fletcher, R., and C. Reeves; "Function minimization by conjugate gradients" (1964), The Computer Journal, v. 7, 149-154.
Chen, S., D. Donoho, and M. Saunders; "Atomic decomposition by basis pursuit" (2001), Society for Industrial and Applied Mathematics Review, v. 43, No. 1. 129-159.
Li, Y., Y. Zhang, and J. Claerbouat; "Hyperbolic estimation of sparse models from erratic data" (2012), Geophysics, v. 77, No. 1, V1-V9.
Hampsonrussel, WellTie. (n.d.). Retrieved Oct. 18, 2019, from https://www.cgg.com/en/What-We-Do/GeoSoftware/Seismic-Reservoir-Characterization/Well-Tie.
Mazumdar, P.;"Poisson dampening factor" (2007), Colorado School of Mines, The Leading Edge, pp. 850-852.
Ming, J., Dehai, Q.; "An Efficient Method of Fluid Discrimination Using Poisson Impedance and Multi-attribute Inversion" (2016), 86th Annual Meeting SEG International Exposition, pp. 2901-2905.
Tian, L., Zhou, D.; "Reservoir prediction using Poisson impedance in Qinhuangdao, Bohai Sea" (2010), SEG Annual Meeting Denver, pp. 2261-2264.
Zhou, Z., Hilterman, F.; "A comparison between methods that discriminate fluid content in unconsolidated sandstone reservoirs" (2010), Geophysics, vol. 75, No. 1, pp. B47-B58.
Xu, S., Chauris, H., Lambare, G., Noble, M.; "Common angle image gather: a strategy for imaging complex media" (1998), Ecole des Mines de Paris.
Koren, Z., Ravve, I.,"Constrainted Dix Inversion" (2006), Geophysics, v. 71, No. 6, pp. R113-R130.

* cited by examiner

COMPUTER-IMPLEMENTED METHOD AND SYSTEM EMPLOYING NONLINEAR DIRECT PRESTACK SEISMIC INVERSION FOR POISSON IMPEDANCE

TECHNICAL FIELD

The present disclosure relates generally to computer-implemented methods and systems for lithology identification and fluid discrimination, in the field of seismic exploration and reservoir characterization.

BACKGROUND OF INVENTION

1. Overview

It is known by persons of ordinary skill in the art, that lithology identification and fluid discrimination. play an important role in seismic exploration and reservoir characterization. The definition of lithology identification and fluid discrimination, has been estimated by using a weighted stack method from prestack seismic data, and was first introduced by Smith, G. and Gidlow, P., during their research of *Weighted stacking for rock property estimation and detection of gas: Geophysical Prospecting* (1987). Later on, Goodway, B., T. Chen, and J. Downton, introduced *Improved AVO fluid detection and lithology discrimination using Lamé petrophysical parameters: "$\lambda\rho$", "$\mu\rho$". & "$\lambda/\mu$ fluid stack" from P and S inversions at the 67th Annual International Meeting*, SEG, founding that Lamé parameters were sensitive to hydrocarbon saturation compared to elastic parameters and proposed a lambda-mu-rho (LMR) method for lithology identification and fluid discrimination. It was later discovered that this method was subject to change, depending upon the depth of burial, compaction and overburden pressure, and as such, had some limitations on practical reservoirs with porous media. In 2006, Quakenbush, M., B. Shang, and C. Tuttle, introduced the concept of Poisson impedance, as applied to lithology identification and fluid discrimination. In fact, in their research paper *Poisson impedance: The Leading Edge*, v.25, no. 2, pp. 128-138, which was considered a relatively novel attribute, a sensitivity tool was first developed off said method for discriminating lithology and fluid content. This kickstarted the era of developing computer-implemented methods for obtaining fluid attributes, performing fluid discrimination but did not include hydrocarbon predictions.

The Poisson impedance attribute was afterwards defined as the weighted difference between acoustic impedance and shear impedance that are optimized by axis rotation to produce better resolution of lithology and fluid content (See e.g. Sharma, R., and S. Chopra, 2013, *Poisson impedance inversion for characterization of sandstone reservoirs*, 83rd Annual International Meeting, SEG, Expanded Abstracts, pp. 2549-2553). With that research in mind, the Poisson impedance was then derived seismically by combing the discrimination characteristics of Poisson's ratio along with bulk density, both of which are parameters used for reservoir delineation. As a result, for the past decade, Poisson impedance has become a very favorable attribute for persons skilled in the art, to use in identifying new prospects and characterizing elastic reservoir properties, showing many successful applications in delineating hydrocarbon-bearing and brine sands from shales.

On the other hand, hydrocarbon predictions from seismic amplitude and amplitude-versus-offset still remain a difficult task. An approach is to use seismic reflections to closely relate them to subsurface rock properties. Yet, the strongest amplitude-versus-offset ("AVO") in the seismic data is often caused by hydrocarbon saturation in the rocks. Advances on the use of prestack seismic inversion for extracting information in terms of subsurface elastic parameters for seismic data have tremendously helped in characterizing lithofacies and predicting reservoir properties with minimum error thereby reducing the number of dry wells and drilling risks in some basins of the world (See e.g. Russel, B., 2014, *Prestack seismic amplitude analysis: an integrated overview: Interpretation*, v.2, no. 2, SC19-SC36). Such prestack seismic inversion models have been routinely applied for lithology prediction and fluid detection to identify potential targets for oil and gas exploration. Most recently, it has been widely used for estimating sweet spots in unconventional shale gas applications.

The essence of the prestack seismic inversion model is in the fact that the shear modulus of a rock does not change when the fluid saturation is changed. The bulk modulus in turn, changes significantly when the fluid saturation is changed. Since the shear modulus of the rock skeleton is equivalent to the shear modulus of the rock with pore fluid, the shear impedance can then be considered as a seismic attribute that mainly connects to the rock skeleton, whereas the acoustic impedance is dominated by both pore fluid and rock skeleton. As a result, the Poisson impedance can optimally eliminate the effect of rock skeleton in shear modulus from the one in acoustic impedance, which in return can produce better resolution of the fluid content. With prestack seismic data, Poisson impedance is conventionally computed indirectly from P-wave, S-wave velocities and density which can be inverted from seismic data directly (See Goodway, supra). However, the indirect way of parameters estimation creates more uncertainties caused by the indirect calculation (See e.g. Zong, Z., X. Yin, and G. Wu, 2013, *Elastic impedance parameterization and inversion with Young's modulus and Poisson's ratio*, Geophysics, v.78, no. 6, N35-N42). Wang, B., X. Yin, and F. Zhang, 2006, in their research paper *Lamé parameters inversion based on elastic impedance and its application: Applied Geophysics*, v. 3, pp. 120-123; compared the direct way to estimate the Lamé parameters from prestack seismic data, to the indirect way of the Lamé parameters estimation using the inverted P-wave and S-wave, but concluding that it still caused much more bias.

Thus, as a result of all these failed attempts to reduce the accumulative error, to provide accurate and reasonable results; direct and indirect, extraction of fluid factors from prestack seismic inversion have gained much attention in recent years, especially given the wider availability and access to system computers with high performance computing systems, required to solve large scientific and engineer problems like the foregoing.

2. Fundamental Basis of Prestack Seismic Inversion

The Zoeppritz equations (Zoeppritz, K., 1919, Erdbebenwellen VII, VII B, Über Reflexion and Durchgang seismischer Wellen durch Unstetigkeitsflächen: Nachrichten von der Königlichen Gesellschaft der Wissenschaften zu Göttingen: Mathematisch-physikalische Klasse, pp. 66-84.) are the fundamental basis of prestack seismic inversion, which describes a nonlinear relationship between the reflectivity of an interface at a given angle of incidence and the elastic properties of the medium on both sides of the interface. However, the inherent complexity and high nonlinearity of the Zoeppritz equations prevents them from solving large-scale multilayered and multidimensional geological models. In practice, prestack seismic inversion methods are based on the first-order linear approximation to the Zoeppritz equations under the assumption that two homogeneous half-spaces are welded at an elastic interface, and that only small relative changes in elastic parameters occur across the boundary. Due to their simplicity in mathematical form and computational efficiency, a series of linearized approximations of the Zoeppritz equation have been derived over the past decades, and used on various computer-implemented methods and systems (See Bortfeld, R., 1961, *Approximations to the reflection and transmission coefficients of plane longitudinal and transverse waves: Geophysical Prospecting*, v. 9, no. 4, pp. 485-502; the Aki Richards equation: Aki, K., and P. Richards, 1980, *Quantitative seismology: Theory and methods: W. H. Freeman and Co.*; Shuey, R., 1985, *A simplification of the Zoeppritz equations: Geophysics*, v. 50, no. 4, pp. 609-614; and Fatti, J., G. Smith, P. Vail, P. Strauss, and P. Levitt, 1994, *Detection of gas in sandstone reservoirs using AVO analysis: A 3-D seismic case history using the geostack technique, Geophysics*, v. 59, no. 9, pp. 1362-1376).

The most well-known industry standard approximations to the Zoeppritz equations were proposed by Aki and Richards, which expressed the P-wave reflectivities as a series of velocities and density contrasts with angles of incidence that were valid up to 40 degrees and small changes of elastic properties across a boundary. The Aki and Richards equation is an important linear approximation to the Zoeppritz equations, which led to the development of other approximate equations that are also widely applied in the industry, namely, those proposed by Shuey and Fatti, supra. However, these equations are derived based on first-order approximation to the Zoeppritz equations and only hold effective for relatively small elastic-property contrasts, across an interface, and for relatively small angles of incidence at the interface. In presence of large relative changes of elastic and anelastic parameters across the reflecting boundary of the survey region, nonlinear approximations to the Zoeppritz equations would be appropriate for accurate determination of elastic parameters. By deriving high order approximations or adding correction terms to a linear approximation, many researchers improved the accuracy of nonlinear approximations to large angles (See Wang, Y., 1999, *Approximations to the Zoeppritz equations and their use in AVO analysis*, Geophysics, v. 64, no. 6, pp. 1920-1927; Stovas, A., and B. Ursin, 2001, Second order approximations of the reflection and transmission coefficients between two viscoelastic isotropic media, Journal of Seismic Exploration, v. 9, pp. 223-233; Zhi, L., S. Chen, and X. Li, 2016, *Amplitude variation with angle inversion using the exact Zoeppritz equations—Theory and methodology*, Geophysics, v. 81, no. 2, N1-N15). In contrast, others have concluded that the nonlinearity of the seismic reflection AVO response is important, even at low-angle range, mostly when the elastic properties that cause the reflection involve sufficiently large contrasts.

3. Quadratic AVO Approximation with Poisson Impedance

Considering a steady-state plane P-wave incident on a horizontally elastic interface of two welded semi-infinite isotropic homogeneous media, the P-wave reflection coefficient that was given in Aki and Richards can be depicted as (1) functions of the angles of incidence, (2) the transmission angle, and (3) six elastic parameters including velocity and density of the upper and lower media over a survey region. For a plane wave propagating through the media, the horizontal slowness or the ray parameter is preserved in the primary and the mode converted waves by means of Snell's law. Therefore, the exact formulae for P-wave reflection coefficient can be expressed in terms of the transmission ray parameter p as a form of rational function (Mallick, S., 1993, *A simple approximation to the P-wave reflection coefficient and its implication in the inversion of amplitude variation with offset data*, Geophysics, 58, no. 4, 544-552):

$$R_{PP}(p) = \frac{A + Bp^2 + Cp^4 - Dp^6}{E + Fp^2 + Gp^4 + Dp^6}, \quad (1)$$

where
$A = (\rho_2 q_{\alpha 1} - \rho_1 q_{\alpha 2})(\rho_2 q_{\beta 1} + \rho_1 q_{\beta 2})$,
$B = 4(\Delta\mu)^2 q_{\alpha 1} q_{\alpha 2} q_{\beta 1} q_{\beta 2} - 4\Delta\mu(\rho_2 q_{\alpha 1} q_{\beta 1} + \rho_1 q_{\alpha 2} q_{\beta 2}) - (\Delta\rho)^2$,
$C = 4(\Delta\mu)^2 (q_{\alpha 1} q_{\beta 1} - q_{\alpha 2} q_{\beta 2}) + 4\Delta\mu\Delta\rho$,
$D = 4(\Delta\mu)^2$,
$E = (\rho_2 q_{\alpha 1} + \rho_1 q_{\alpha 2})(\rho_2 q_{\beta 1} + \rho_1 q_{\beta 2})$,
$F = 4(\Delta\mu)^2 q_{\alpha 1} q_{\alpha 2} q_{\beta 1} q_{\beta 2} - 4\Delta\mu(\rho_2 q_{\alpha 1} q_{\beta 1} + \rho_1 q_{\alpha 2} q_{\beta 2}) + (\Delta\rho)^2$,
and
$G = 4(\Delta\mu)^2 (q_{\alpha 1} q_{\beta 1} + q_{\alpha 1} q_{\beta 1} + q_{\alpha 2} q_{\beta 2}) - 4 \Delta\mu\Delta\rho$,
where $\rho_1$ and $\rho_2$ are the density across an interface; $q_{\alpha 1}$, $q_{\alpha 2}$, $q_{\beta 1}$ and $q_{\beta 2}$ are the P-wave and S-wave vertical slowness's that can be read as functions of the ray parameter p, P-wave velocities $\alpha_1$, and $\alpha_2$, S-wave velocities $\beta_1$ and $\beta_2$, respectively. The subscript numbers 1 and 2 represent the upper and lower layers. $\Delta\rho = \rho_2 - \rho_1$ defines the contrast in density and $\Delta\mu = \rho_2 \beta_2^2 - \rho_1 \beta_1^2$ is the contrast in shear moduli.

By applying the Taylor expansion to equation 1 at the point where the transmission ray parameter sets to zero, and omitting any high order terms, an approximation to the equation 1 can be represented in a quadratic form with respect to the ray parameter p $$R_{PP}(p) \approx \frac{A}{E} + \left(\frac{B}{E} - \frac{AF}{E^2}\right)p^2 = \frac{A}{E} + \frac{1}{E}\left(B - \frac{A}{E}F\right)p^2 \quad (2)$$

and $$\frac{A}{E} = \frac{\rho_2 q_{\alpha 1} - \rho_1 q_{\alpha 2}}{\rho_2 q_{\alpha 1} + \rho_1 q_{\alpha 2}} = \frac{\rho_2 \alpha_2 \cos\theta_1 - \rho_1 \alpha_1 \cos\theta_2}{\rho_2 \alpha_2 \cos\theta_1 + \rho_1 \alpha_1 \cos\theta_2} \quad (3)$$

where $\theta_1$ and $\theta_2$ are the incidence and transmission angles of the P-wave across the interface, respectively. Equation 3 can be understood as the fluid-to-fluid reflection coefficient $R_f$, which is the reflection coefficient between two medias when the corresponding shear wave velocity in both medias are set to zero.

Finally, after various substitutions and iterations of equation (1), the quadratic four-term approximation to the Zoeppritz equation for Poisson impedance is then computed in the present invention as:

$$R_{PP}(\theta) = \left[\frac{1}{2}\sec^2\theta - \frac{4}{c}\left(\frac{\beta}{\alpha}\right)\sin^2\theta\right]\frac{\Delta\alpha}{\alpha} + \left[\frac{4}{c}\left(\frac{\beta}{\alpha}\right) - 4\left(\frac{\beta}{\alpha}\right)^2\right] \quad (4)$$

$$\sin^2\theta\frac{\Delta PI}{PI} + \left[\frac{1}{2} - \frac{4}{c}\left(\frac{\beta}{\alpha}\right)\sin^2\theta + 2\left(\frac{\beta}{\alpha}\right)^2 \sin^2\theta\right]\frac{\Delta\rho}{\rho} +$$

$$\left[\frac{2}{c}\frac{\Delta\alpha}{\alpha} - \left(\frac{2}{c} - 2\frac{\beta}{\alpha}\right)\frac{\Delta PI}{PI} + \left(\frac{2}{c} - \frac{\beta}{\alpha}\right)\frac{\Delta\rho}{\rho}\right]^2 \frac{\beta}{\alpha}\cos\theta\sin^2\theta$$

Equation (4) is a quadratic approximation computed in the presented invention with respect to relative contrasts in three parameters of P-wave velocity, Poisson impedance and density at the interface.

4. Nonlinear AVO Inversion for Poisson Impedance

The quadratic AVO approximate equation (4) provides a nonlinear relationship between the P-wave reflection coefficient and three elastic parameters—the P-wave velocity reflectivity, the Poisson impedance reflectivity, and the density reflectivity—which are essential in estimating rock properties over a single, or various points of incidences, regardless of biasing factors. Said nonlinear AVO inversion can be implemented using a Gauss-Newton scheme. Nevertheless, most AVO inversion approaches are an ill-posed problem as some require appropriate smoothing or filtering techniques to render the solution unique and stable. Therefore, in order for a computer-implemented method and system to product accurate and efficient results, it is necessary to solve this nonlinear problem as a regularized inversion approach. Here, a damped Gauss-Newton method is used to solve the nonlinear AVO equation, honoring the prestack seismic data and exploiting a combination of constraints and analytical trend. For example, due to the band-limited nature of seismic data, the low-frequency models computed from stacking velocities and well logs are incorporated into the objective function, to enhance the stability and accuracy of the inversion (Xia, F., S. Zhao, W. Ding, and Y. Chen, 2019, *Constraints guided basis pursuit prestack AVA inversion*, 89th Annual International Meeting, SEG, Expanded Abstracts, pp. 585-589). Moreover, lateral constraints can be included in the objective function that serves to enforce spatial correlation between adjacent traces (Hamid, H., and A. Pidlisecky, 2015, *Multitrace impedance inversion with lateral constraints*, Geophysics, v. 80, no. 6, M101-M111).

In order to invert the P-wave velocity, Poisson impedance and density; equation (4) is automatically rearranged to:

$$R_{PP}(\theta) = \overline{R}_{PP}(\theta) + \tilde{R}_{PP}(\theta), \tag{5}$$

where, $$\overline{R}_{PP}(\theta) = A(\theta)\frac{\Delta\alpha}{\alpha} + B(\theta)\frac{\Delta PI}{PI} + C(\theta)\frac{\Delta\rho}{\rho}, \tag{6}$$

$$\tilde{R}_{PP}(\theta) = D(\theta)\Psi^{2!}\left(\frac{\Delta\alpha}{\alpha}, \frac{\Delta PI}{PI}, \frac{\Delta\rho}{\rho}\right), \tag{7}$$

and $$A(\theta) = \frac{1}{2}\sec^2\theta - \frac{4}{c}\left(\frac{\beta}{\alpha}\right)\sin^2\theta, \tag{8}$$

$$B(\theta) = \left[\frac{4}{c}\left(\frac{\beta}{\alpha}\right) - 4\left(\frac{\beta}{\alpha}\right)^2\right]\sin^2\theta, \tag{9}$$

$$C(\theta) = \frac{1}{2} - \frac{4}{c}\left(\frac{\beta}{\alpha}\right)\sin^2\theta + 2\left(\frac{\beta}{\alpha}\right)^2\sin^2\theta, \tag{10}$$

$$D(\theta) = \frac{\beta}{\alpha}\cos\theta\sin^2\theta, \tag{11}$$

$$\Psi = \frac{2}{c}\frac{\Delta\alpha}{\alpha} - \left(\frac{2}{c} - 2\frac{\beta}{\alpha}\right)\frac{\Delta PI}{PI} + \left(\frac{2}{c} - \frac{\beta}{\alpha}\right)\frac{\Delta\rho}{\rho}, \tag{12}$$

Equation (6) is the linearized approximation of the Zoeppritz equation that is equivalent to rearranging the Aki-Richards equation with respect to Poisson impedance. Given a prestack angle gather with M angles and each trace containing N samples, equation (6) can be rewritten into a matrix-vector form:

$$\begin{bmatrix} \overline{r}_1 \\ \overline{r}_2 \\ \vdots \\ \overline{r}_M \end{bmatrix} = \begin{bmatrix} A_1 & B_1 & C_1 \\ A_2 & B_2 & C_2 \\ \vdots & \vdots & \vdots \\ A_M & B_M & C_M \end{bmatrix} \begin{bmatrix} m_\alpha \\ m_{PI} \\ m_\rho \end{bmatrix}, \tag{13}$$

where $\overline{r}_i$ is the linear reflectivity vector at each angle, $$\overline{r}_i = [\overline{r}_{i,1} \overline{r}_{i,2} \ldots \overline{r}_{i,N}]^T, \tag{14}$$

and, $$A_i = \text{diag}[A_{i,1} A_{i,2} \ldots A_{i,N}]^T, \tag{15}$$

$$B_i = \text{diag}[B_{i,1} B_{i,2} \ldots B_{i,N}]^T, \tag{16}$$

$$C_i = \text{diag}[C_{i,1} C_{i,2} \ldots C_{i,N}]^T, \tag{17}$$

where $m_\alpha$, $m_{PI}$ and $m_\rho$ are the vectors of P-wave velocity reflectivity, Poisson impedance reflectivity, and density reflectivity, respectively.

$$m_\alpha = \frac{\Delta\alpha}{\alpha} = [m_{\alpha,1} \quad m_{\alpha,2} \quad \ldots \quad m_{\alpha,N}]^T, \tag{18}$$

$$m_{PI} = \frac{\Delta PI}{PI} = [m_{PI,1} \quad m_{PI,2} \quad \ldots \quad m_{PI,N}]^T, \tag{19}$$

$$m_\rho = \frac{\Delta\rho}{\rho} = [m_{\rho,1} \quad m_{\rho,2} \quad \ldots \quad m_{\rho,N}]^T, \tag{20}$$

Equation (7) is the nonlinear reflectivity of the approximation to the Zoeppritz equation, which includes a quadratic term as a function of the three elastic parameters $m^\alpha$, $m_{PI}$ and $m_\rho$. Similarly, equation (7) is rewritten as a matrix-vector form as shown below in bold:

$$\begin{bmatrix} \tilde{r}_1 \\ \tilde{r}_2 \\ \vdots \\ \tilde{r}_M \end{bmatrix} = \begin{bmatrix} D_1 \\ D_2 \\ \vdots \\ D_M \end{bmatrix} \cdot \left(\begin{bmatrix} \psi_\alpha \\ \psi_{PI} \\ \psi_\rho \end{bmatrix}^T \cdot \begin{bmatrix} m_\alpha \\ m_{PI} \\ m_\rho \end{bmatrix}\right)^2, \tag{21}$$

where $\tilde{r}_i$ is the nonlinear reflectivity vector at each angle, $$\tilde{r}_i = [\tilde{r}_{i,1} \quad \tilde{r}_{i,2} \quad \ldots \quad \tilde{r}_{i,N}]^T \tag{22}$$

and $$D_i = \text{diag}[D_{i,1} \quad D_{i,2} \quad \ldots \quad D_{i,N}]^T \tag{23}$$

$$\psi_\alpha = \frac{2}{c}\text{diag}[\psi_{\alpha,1} \quad \psi_{\alpha,2} \quad \ldots \quad \psi_{\alpha,N}]^T \tag{24}$$

$$\psi_{PI} = 2\frac{\beta}{\alpha} - \frac{2}{c} = \text{diag}[\psi_{PI,1} \quad \psi_{PI,2} \quad \ldots \quad \psi_{PI,N}]^T \tag{25}$$

$$\psi_\rho = \frac{2}{c} - \frac{\beta}{\alpha} = \text{diag}[\psi_{\rho,1} \quad \psi_{\rho,2} \quad \ldots \quad \psi_{\rho,N}]^T \tag{26}$$

From an inversion perspective, the perturbation of Poisson impedance to the background will be inverted from the prestack seismic data. The coefficient B in equation (9) plays an important role for contributing overall data misfits to the Poisson impedance. As such, equation (9) is made equal to zero, and what it is found is that a singularity for rotation optimization factor c, exists for all angles of incidence, as represented by:

$$c = \alpha/\beta, \quad (27)$$

For simplicity reasons, equation (5) it is then rewritten as a nonlinear forward problem, resulting in:

$$r = f(m), \quad (28)$$

where r is the P-wave reflection coefficient, f is the nonlinear operator containing matrix A, B, C, D and $\psi$, and m is the unknown reflectivity contrast containing $m_\alpha$, $m_{PI}$, and $m_\rho$ that we are inverting for.

A noisy seismic trace d can be written as a summation of a given angle dependent wavelet W, convolved with a reflection coefficient r and an error vector e:

$$d = Wr + e, \quad (29)$$

Combing equation 28 and equation 29 yields $$d = Wf(m) + e, \quad (30)$$

The nonlinear AVO inversion of equation (30) is then solved using a Gauss-Newton approach. Assuming that a model update m can be expressed as a combination of an initial reference model $m_0$ and a model perturbation $\Delta m$, using the first-order Taylor series expansion, the linearization of the nonlinear AVO equation (30) is then rewritten as:

$$d = Wf(m_0) + WF\Delta m + e, \quad (31)$$

where, $f(m_0)$ is the P-wave reflection coefficient evaluated at a reference model $m_0$, and F represents the Fréchet derivatives, i.e., the matrix of partial derivatives of data d with respect to model parameters m as shown below:

$$F = \frac{\partial d}{\partial m} = \begin{bmatrix} A_1 + 2\Psi^T D_1 \Psi_\alpha & B_1 + 2\Psi^T D_1 \Psi_{PI} & C_1 + 2\Psi^T D_1 \Psi_\rho \\ A_2 + 2\Psi^T D_2 \Psi_\alpha & B_2 + 2\Psi^T D_2 \Psi_{PI} & C_2 + 2\Psi^T D_2 \Psi_\rho \\ \vdots & \vdots & \vdots \\ A_M + 2\Psi^T D_M \Psi_\alpha & B_M + 2\Psi^T D_M \Psi_{PI} & C_M + 2\Psi^T D_M \Psi_\rho \end{bmatrix} \quad (32)$$

A Gauss-Newton approach begins with a starting guess for the model like $m_0$ and iterates with (1) linearizing the data residuals to predict how far the predicted values are from the correct value near the current model update, and (2) computing a linear least-squares norm using the data residuals from (1) until convergence in the inversion process is achieved when the norm is less than or equal to the user defined tolerance value. Therefore, the Gauss-Newton method iteratively approximates the objective function as a quadratic function of a perturbation of the model:

$$J(m) = [d - Wf(m_0) - WF\Delta m]^T C_e^{-1} [d - Wf(m_0) - WF\Delta m] + m^T C_m^{-1} m \quad (33)$$

where $C_e^{-1}$ and $C_m^{-1}$ are the covariance matrices of the data error and model parameters, respectively.

To smooth or enhance the stability in solving equation (33), additional constraints are added to contribute to the fast convergence of the inversion process thereby incorporating low frequency constraints into the objective function as a penalty function (Xia, F., et. al, supra), and then adding a structural constraint to improve lateral continuity in the inversion model (Hamid, H., and A. Pidlisecky, 2015, *Multitrace impedance inversion with lateral constraints*, Geophysics, 80, no. 6, M101-M111). Minimizing the target function (33) and combing with the model constraints yield the final objective function:

$$J(m) = [d - Wf(m_0) - WF\Delta m]^T C_e^{-1} [d - Wf(m_0) - WF\Delta m] + m^T C_m^{-1} m + (m - \hat{m})^T C_\rho^{-1} (m - \hat{m}) + \mathcal{L}_{(m^T)} C_\ell^{-1} \mathcal{L}_{(m)} \quad (34)$$

where $\hat{m}$ is the low-frequency trend model, which can be easily estimated from well-logging or stacking velocity.

The last three terms of equation (34) define a smoothing function on the model space. Here, an inverse covariance matrix $C_\rho^{-1}$ relates to a weighting operator of data fitting, multiplied by its adjoint; the operator $\mathcal{L}$ transforms the model space from a vertical direction to a horizontal direction; and an inverse covariance matrix $C_\ell^{-1}$ relates to the roughening operator, for example, a second-order derivative in the horizontal direction, multiplied by its adjoint.

Under the Gauss-Newton approach, in order to minimize the quadratic objective function (34), the perturbation of the model $\Delta m$ is a linear least-squares problem in terms of the remaining error in the data $d - Wf(m_0)$. Therefore, the linear least-squares problem can be solved by the well-established conjugate gradient method (Fletcher, R., and C. Reeves, 1964, *Function minimization by conjugate gradients*, The Computer Journal, v. 7, 149-154). The gradient in the conjugate gradient method is the gradient of the objective function and is determined by taking the derivative of the objective function with respect to the model $m^T$, and it is used to describe the direction in which a function decreases the most quickly as expressed by:

$$g(m) = \frac{\partial}{\partial m^T} J(m) = F^T W^T C_e^{-1} r + C_m^{-1} m + C_p^{-1}(m - \hat{m}) + C_\ell^{-1} \mathcal{L}(m) \quad (35)$$

where r is the data residual and is defined as $r = d - Wf(m_0)$.

For a survey region with a geological setting that contains sharp interface contrast, a basis pursuit method (Chen, S., D. Donoho, and M. Saunders, 2001, *Atomic decomposition by basis pursuit*, Society for Industrial and Applied Mathematics Review: v. 43, no. 1. 129-159) or a hybrid $\ell^{1}/\ell^{2}$-norm method (Li, Y., Y. Zhang, and J. Claerbout, 2012, Hyperbolic estimation of sparse models from erratic data: Geophysics, v. 77, no. 1, V1-V9) ensures the sparsity of reflection coefficients and the blocky structure of model parameters, which could be more desirable than a smooth model that is a result of solving $\ell^{2}$-norm optimization problem.

5. The Well-to-Seismic Tie Approach

A well-to-seismic tie approach is also commonly known in the art as, a well tie approach, or just a well-to-seismic approach. Regardless of how it is called, persons of ordinary skill in the art, understand that they are paramount in the calibration of a seismic interpretation, as well as the cornerstone of using seismic amplitudes in impedance and AVO inversion, and ultimately for inferences fed into the risking process. They provide a means of (1) correctly identifying horizons to pick, and (2) refining or updating the angle dependent, or angle wavelet for prestack seismic inversion.

In order to compute a well tie approach, a synthetic seismogram is matched to a real seismic trace and features from a well are correlated to the seismic data. The prime concept in constructing the synthetic is the convolutional model. This represents a seismic reflection signal as a sequence of interfering reflection pulses of different amplitudes and polarity but all of the same shape. This pulse-shape is the seismic wavelet, or angle wavelet, formally the reflection waveform returned by an isolated reflector of unit strength at the target depth. Because reflecting boundaries are spaced much more finely in depth than the length of the reflected pulses, the degree of interference is generally severe and only the strongest reflectors or reflection complexes stand out in the reflection signal.

Several geophysical software packages for performing well-to-seismic approach are known in the art. Examples of such products include WellTie available from HampsonRussell which utilizes other software applications that work together which are the Estimate Wavelets and Well Log Editor, also from HampsonRussel. According to these known computer-implemented techniques, an optimum angle dependent wavelet is determined to be that which, when convolved with well log reflectivities, results in a synthetic that best matches the input seismic in a least-squares way. The candidate angle wavelet is then further vetted by evaluating its ability to perform seismic inversion on the input traces. Various quality controls are available to evaluate its performance.

Regardless of the software package use, when tying wells, the angle dependent wavelet is updated to interact with well-log measurements to create a synthetic representation of the seismic according to the borehole. This is done in steps commencing by: (1) obtaining the measured seismogram at well location; (2) obtaining and computing the time-depth relationship from well logs; (3) computing reflection coefficients in time; (4) making a synthetic seismogram by convolving the reflection-coefficient series with a seismic angle dependent wavelet; and (5) correlating the synthetically created seismogram to the measured seismogram at well location.

SUMMARY OF THE INVENTION

Typically, exploration and reservoir characterizations are performed over a region that is surveyed for its soil, and fluid potential properties. Depending upon the properties found in the survey region, one or various hydrocarbon (i.e., oil and gas) reservoirs may be established. Once these reservoirs, or wells, are established within the survey region computer-implemented methods are used for automating the interpretation of seismic results. Many of these computer-implemented methods use an inversion model which comprise of an analytical approach in which depth-domain signals corresponding to the reflection of acoustic energy from reflective interfaces between subsurface strata in the earth are converted into one or more traces representative of physical attributes of the strata. In contrast, it is therefore an object of the present invention to provide a computer-implemented method for lithology identification and fluid discrimination, in the field of seismic exploration and reservoir characterization using a nonlinear direct prestack model.

In the time-domain the reflectivity-based computer-implemented inversion method and system of the present invention, is developed under the assumption that the amplitude of seismic data depends on the reflection coefficients, which means that the seismic data prior to inversion has been fully corrected for the wave propagation effects—such as transmission loss, interval multiple scattering and mode conversions—through advanced prestack migration techniques.

Therefore, an object of the present invention is to implement it into an automated computer method for estimating the Poisson impedance to avoid uncertainty, propagation and accumulative errors from indirect calculations in a survey region having at least one hydrocarbon well or reservoir location.

In one embodiment of the invention, the computer-implemented method retrieves upscaled well log data represented in time domain, including compressional velocity, shear velocity, and density data over various points of incidence for the survey region. It further retrieves from the same survey region, a set of angle image gathers, preconditioned to preserve a signal amplitude information of various angles of incidence; as well as earth model data that includes horizons information, and seismic velocity data over time. It then generates, through interpolation, various low frequency models that are grouped into sets based on the retrieved earth model data, the upscaled well log data, and it also generates a set of angle wavelets over the survey region. It then applies a well-to-seismic-tie approach to the set of angle image gathers, and the upscaled well log data, in order to update the set of angle wavelets. Using calculations dependent upon the retrieved data points, it computes a nonlinear direct prestack seismic inversion model by combining the first angle image gather from the set of angle image gathers, with the corresponding first low frequency model from the set of low frequency models, and to the set of angle wavelets. The computer-implemented method automatically repeats the select, and compute steps for the survey region until all gathers from the set of angle image gathers, and all corresponding low frequency models from the set of low frequency models have been combined to the set of angle wavelets. As a quality control-method, the computer-implemented method verifies that the a final nonlinear direct prestack seismic inversion model was performed during the automatic repeat steps, by combining a final angle image gather from the set of angle image gathers, with a corresponding final low frequency model from the set of low frequency models to the set of angle wavelets. Finally, it produces a final model of elastic properties from the results of said nonlinear direct prestack seismic inversion model in the survey region by calculating the exponential integration of the elastic reflectiveness.

Due to the foregoing, there exists the need to develop a computer-implemented method and system, that computes a nonlinear direct prestack seismic inversion model while using the Poisson impedance, to avoid the uncertainty, propagation, and accumulative error from other methods and systems using indirect calculations. The proposed embodiments consider the reflection response at pre-critical angles of incidence and is not subject to the assumption of weak contrast interfaces, or of the biasing pieces of data. In fact, the accuracy of the proposed computer-implement method was examined by comparing it with the classic Aki-Richards (see also FIG. 9) equation as well as to the exact Zoeppritz equation, with the inversion results obtained generating a more stable and accurate estimation for Poisson impedance. Further, test results showed that the present invention using the nonlinear direct prestack inversion computer-implement method and system, has great potential for other practical applications, as well.

BRIEF DESCRIPTION OF THE DRAWINGS

The teachings of the present invention can be readily understood by considering the following detailed description in conjunction with the accompanying drawings.

FIG. 10. Illustrates in graphic representation, a final model of elastic properties produced by the present computer-implemented method and system.

DETAILED DESCRIPTION OF THE INVENTION

Reference will now be made in detail, to several embodiments of the present disclosures, examples of which, are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures, systems, and methods illustrated herein may be employed without departing from the principles of the disclosure described herein.

Figure 1:
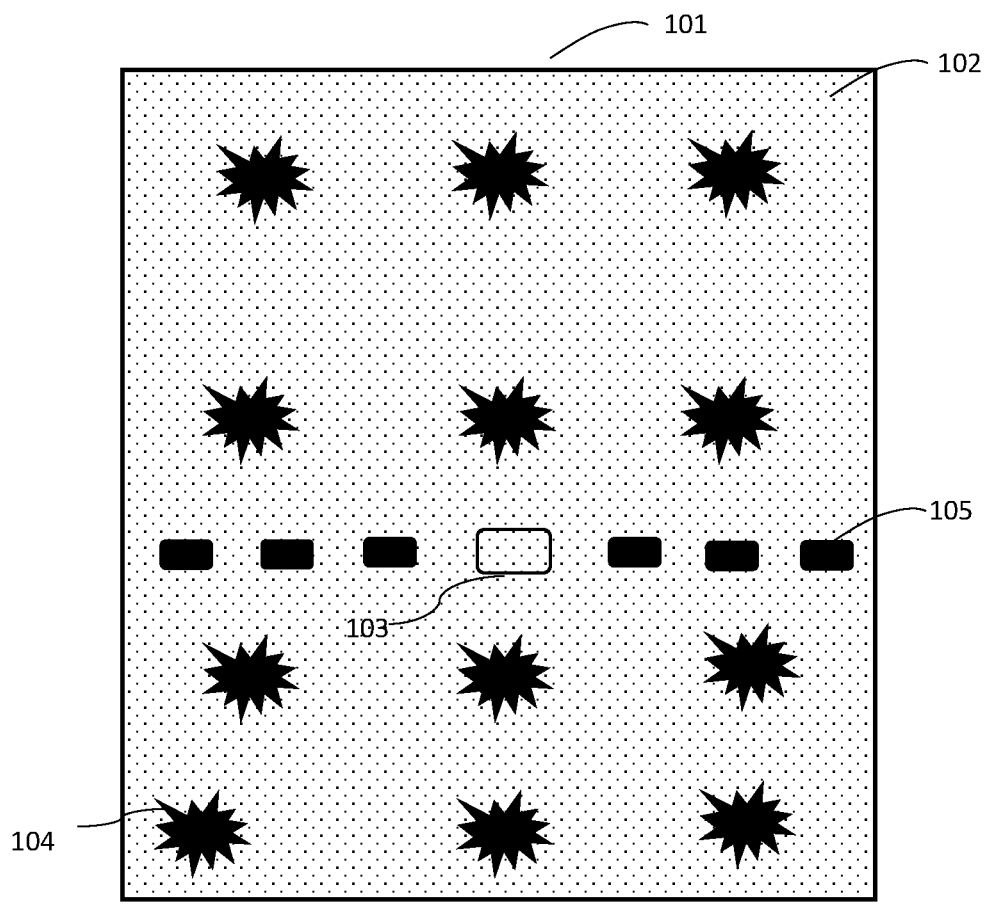
FIG. 1. Is a schematic diagram showing a top view of a survey region with the various points of incidence of seismic sources according to an embodiment of the present disclosure.

FIG. 1 illustrates a seismic survey region, 101, in which the preferred embodiment of the present invention is useful. It is important to note, that the survey region of FIG. 1 is a land-based region represented as 102. Persons of ordinary skill in the art, will recognize that seismic survey regions produce detailed images of local geology in order to determine the location and size of possible hydrocarbon (oil and gas) reservoirs, and therefore a well location 103. In these survey regions, sound waves bounce off underground rock formations during blasts at various points of incidence 104, and the waves that reflect back to the surface are captured by seismic data recording sensors, 105, transmitted by data transmission systems, 1101, wirelessly, 1102, from said sensors, 105, then stored for later processing, and analysis by the digital high performance computing system of FIG. 11.

Figure 2:
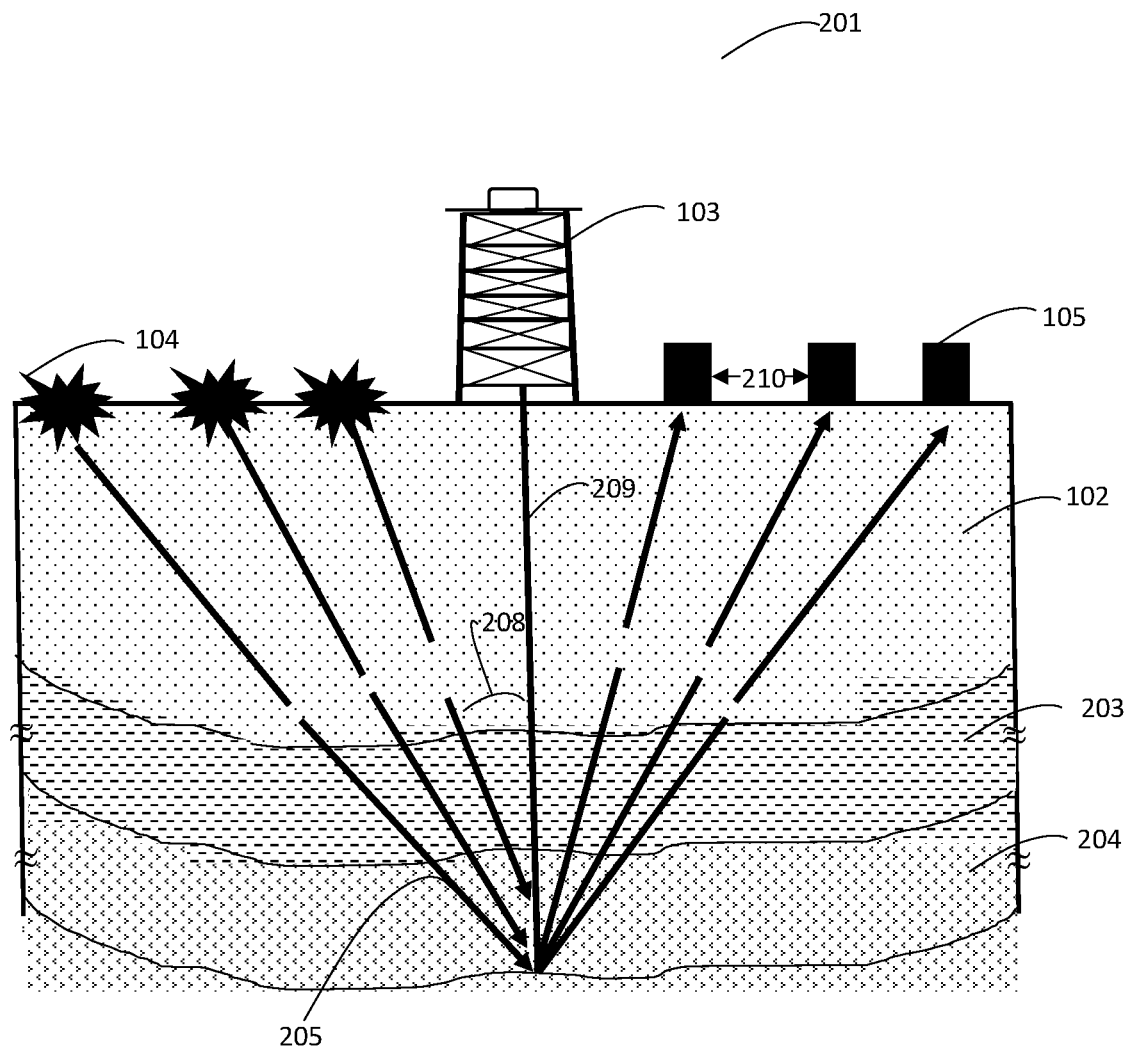
FIG. 2. Is a schematic diagram showing a cross-sectional view of an illustrative environment with points of incidence of seismic sources, seismic receivers, a well location, a wellbore, the various transmission rays, and the various angles of incidence, according to certain embodiments of the present disclosure.

In FIG. 2 a cross-sectional view of a portion of the earth over the survey region is illustrated as 201, showing different types of earth formation, 102, 203, 204, which will comprise the Oseismic survey data in the present invention. In particular, persons having ordinary skill in the art will soon realize that the present example shows a common midpoint-style gather, where seismic data traces are sorted by surface geometry to approximate a single reflection point in the earth. In this example, data from several shots and receivers may be combined into a single image gather, or used individually depending upon the type of analysis to be performed. Although the present example may illustrate a flat reflector and a respective image gather class, other types or classes of image gathers known in the art maybe used, and its selection may depend upon the presence of various earth conditions or events.

As shown on FIG. 2, seismic energy from multiple points of incidence 104, will be reflected from the interface between the different earth formations. These reflections will be captured by multiple seismic data recording sensors 105, each of which will be placed at different location offsets 210 from each other, and the well 103. Because all points of incidences 104, and all seismic data recording sensors 105 are placed at different offsets 210, the survey seismic data or traces, also known in the art as gathers, will be recorded at various angles of incidence represented by 208. The points of incidence 104 generate downward transmission rays 205, in the earth that are captured by their upward transmission reflection through the recording sensors 105. Well location 103, in this example, is illustrated with an existing drilled well attached to a wellbore, 209, along which multiple measurements are obtained using techniques known in the art. This wellbore 209, is used to obtain well log data, that includes P-wave velocity, S-wave velocity, Density, among others. Other sensors, not depicted in FIG. 2, are placed within the survey region to also capture horizons data information required for interpreters and persons of ordinary skilled in the art to perform various geophysical analysis. In the present example, the gathers will be sorted from field records in order to examine the dependence of amplitude, signal-to-noise, move-out, frequency content, phase, and other seismic attributes, on incidence angles 208, offset measurements 210, azimuth, and other geometric attributes that are important for data processing and imaging and known by persons having ordinary skills in the art.

However, to perform elastic reflectivity analysis it is often useful in the art, to exploit the redundancy of seismic data and produce images with more dimensions than the two coordinates of the physical space. In the present invention, the final model of elastic properties 314 results in a three-dimensional cube made by computing a wide array of data, mainly represented in time domain. When the final model of elastic properties 314 is created, no additional dimensions get included which in other situations, could have either be the absolute offset and azimuth. In the preferred embodiment of this invention, because the final model of elastic properties 314 is created according to a three-dimensional coordinate, the cube will end up comprising the in-line, cross-line, and time input variables.

Figure 3:
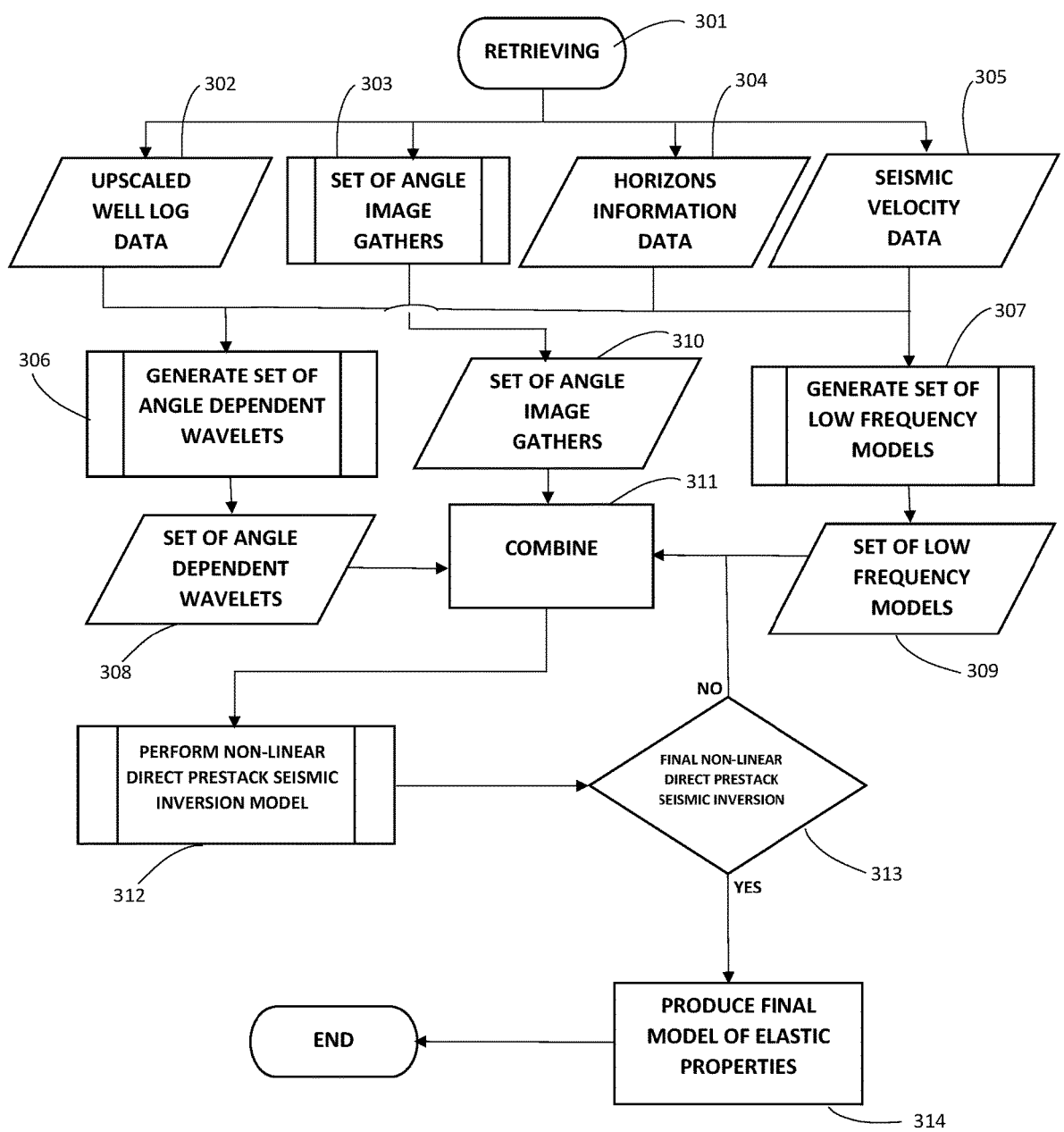
FIG. 3. Is a flow chart showing the computer-implemented method employing nonlinear direct prestack seismic inversion for Poisson impedance, according to an embodiment of the present disclosure.
Figure 4:
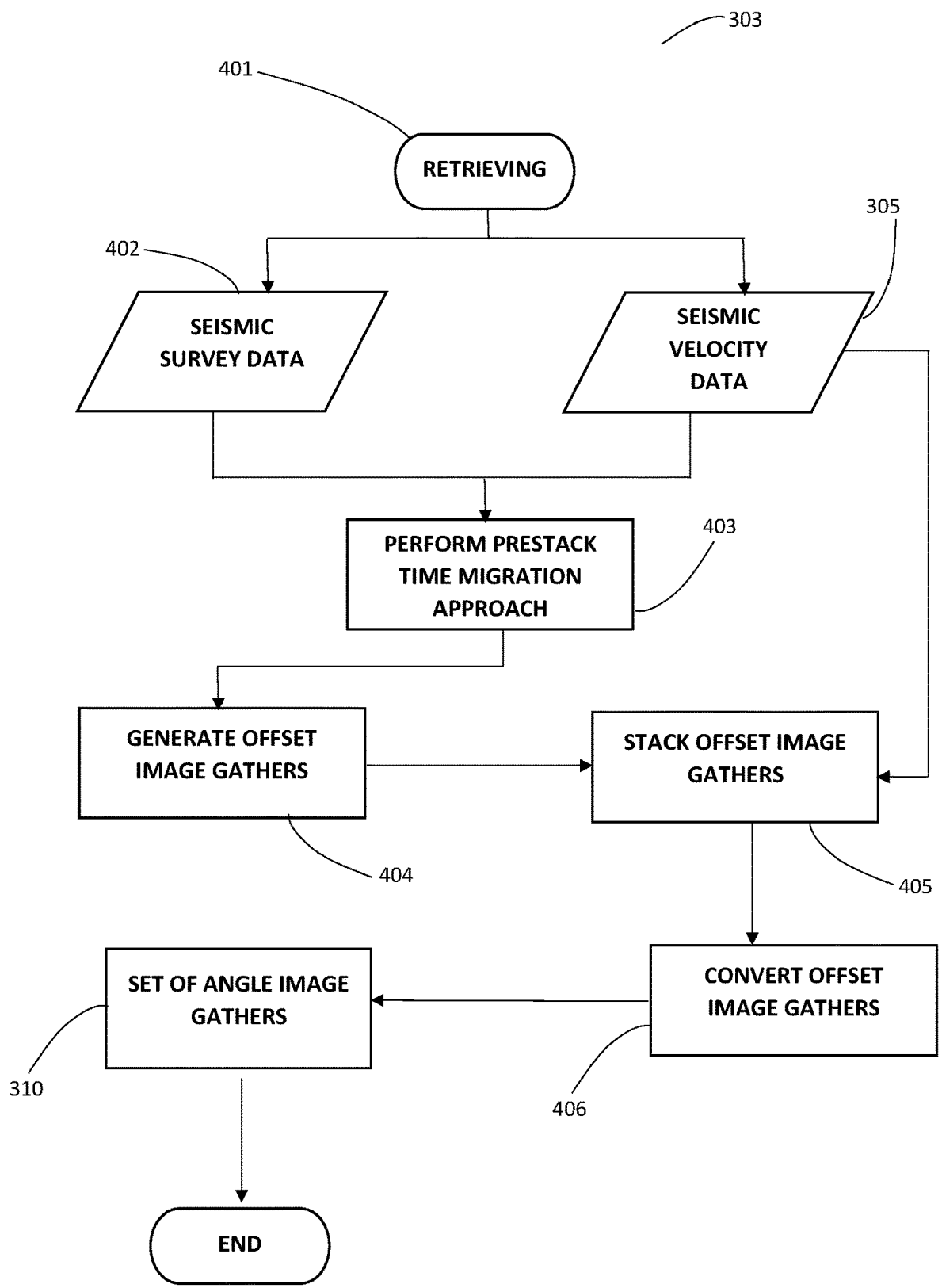
FIG. 4. Is a flow diagram illustrating a method for generating a set of angle image gathers, according to an embodiment of the present disclosure.
Figures 7A, 7B, 7C:
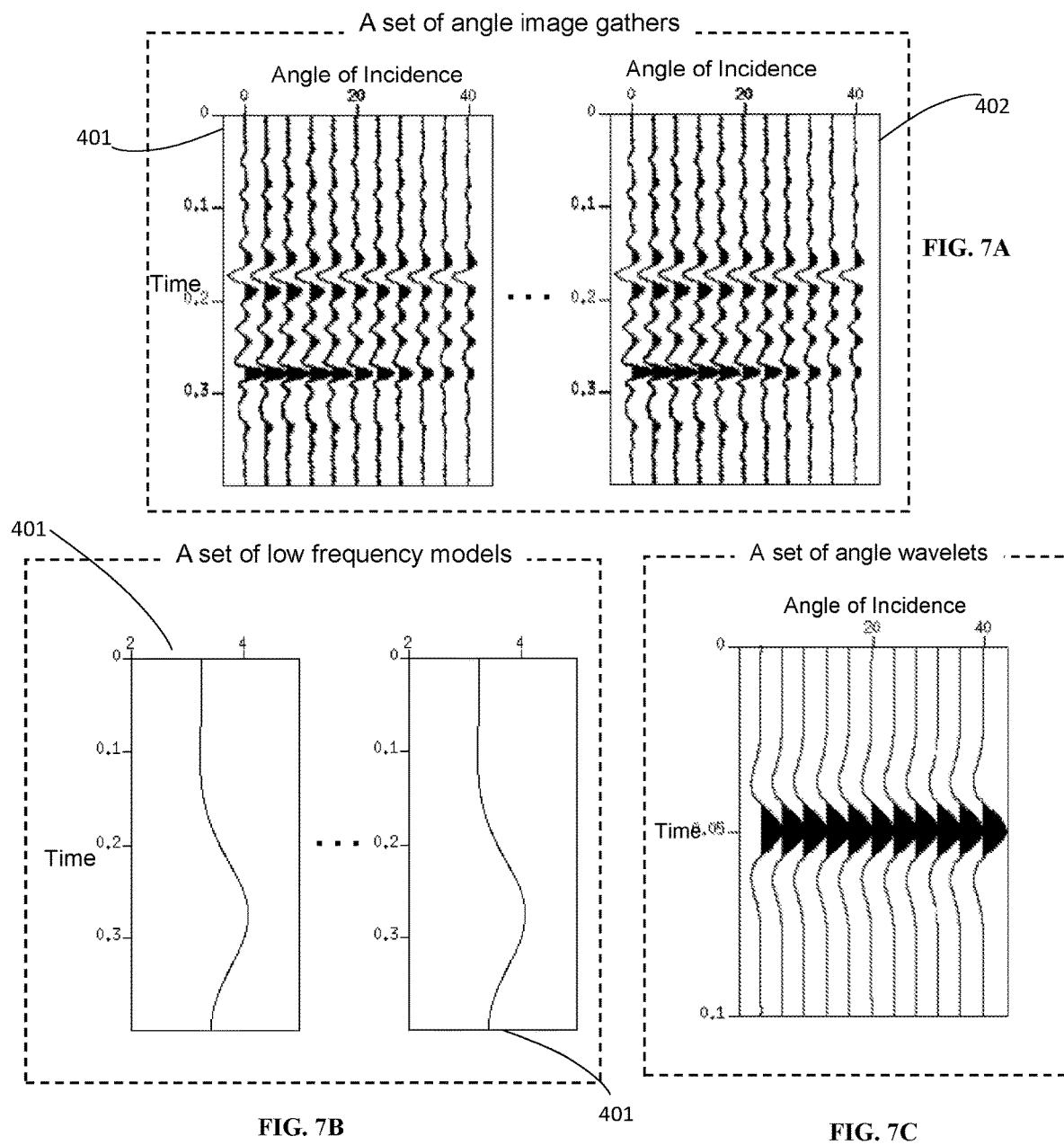
FIG. 7. Illustrates in graphic representation, the outputs generated by the steps of generating a set of angle image gathers (FIG. 7A), the steps of generating a set of low frequency models (FIG. 7B), the steps of generating a set of angle dependent wavelets (FIG. 7C), according to an embodiment of the present disclosure.

With regards to FIG. 3, it illustrates a flow chart with an overview of the preferred embodiment of the invention. The retrieving phase 301 initiates the process, and comprises obtaining and preparing data and information from the survey region. In particular, four different types of inputs are retrieved from seismic data over a survey region: upscaled well log data represented in time domain 302, a set of angle image gathers 310, horizons information 304, and seismic velocity data 305. The well log data may be obtained directly from the well location and remotely transferred onto a database, 1103, for further compilation, such as that contemplated on FIG. 11. It may also be retrieved from database 1103, by system computer 1105. For the present invention, the well log data comprises the P-wave velocity, S-wave velocity, and density over the survey region. Further, the set of angle image gathers 310 (further exemplified by FIG. 7A) comprise a plurality of image gathers, constant with the amount of points of incidence 104 within a survey region 101 represented in the time domain at the various angles of incidence 208. Nonetheless, since this seismic survey data 402 data is too raw, noisy, or from various points of incidence 104, it needs to be further processed. This further refinement of the set of angle image gathers is sub-routine procedure 303, within the present computer-implement method is illustrated in FIG. 4. Procedure 303 retrieves 401 seismic survey data 402, and seismic velocity data 305 for survey region 101, all of which are to be stored in a database, such as storage device 1104, and retrieved therefrom by system computer 1105 for further processing. The sub-routine, using high performance computing of FIG. 11, performs a prestack time migration approach 403 which solves the problem of conflicting dips with different stacking velocities, and data. The offset image gathers are then generated 404, stacked 405, and converted back to the time domain 406 with a radial-trace mapping originally introduced for shot-geophone migration. The final set of angle image gathers are generated 310 for the various points of incidence 104 over the survey region 101. FIG. 7A illustrates an example of what comprises a set of angle image gathers in the present invention. Further, the high performance computing system of FIG. 11, contemplate these set of angle image gathers data 310 to be stored in a database, such as storage device 1104, and retrieved therefrom by system computer 1105.

Figure 11:
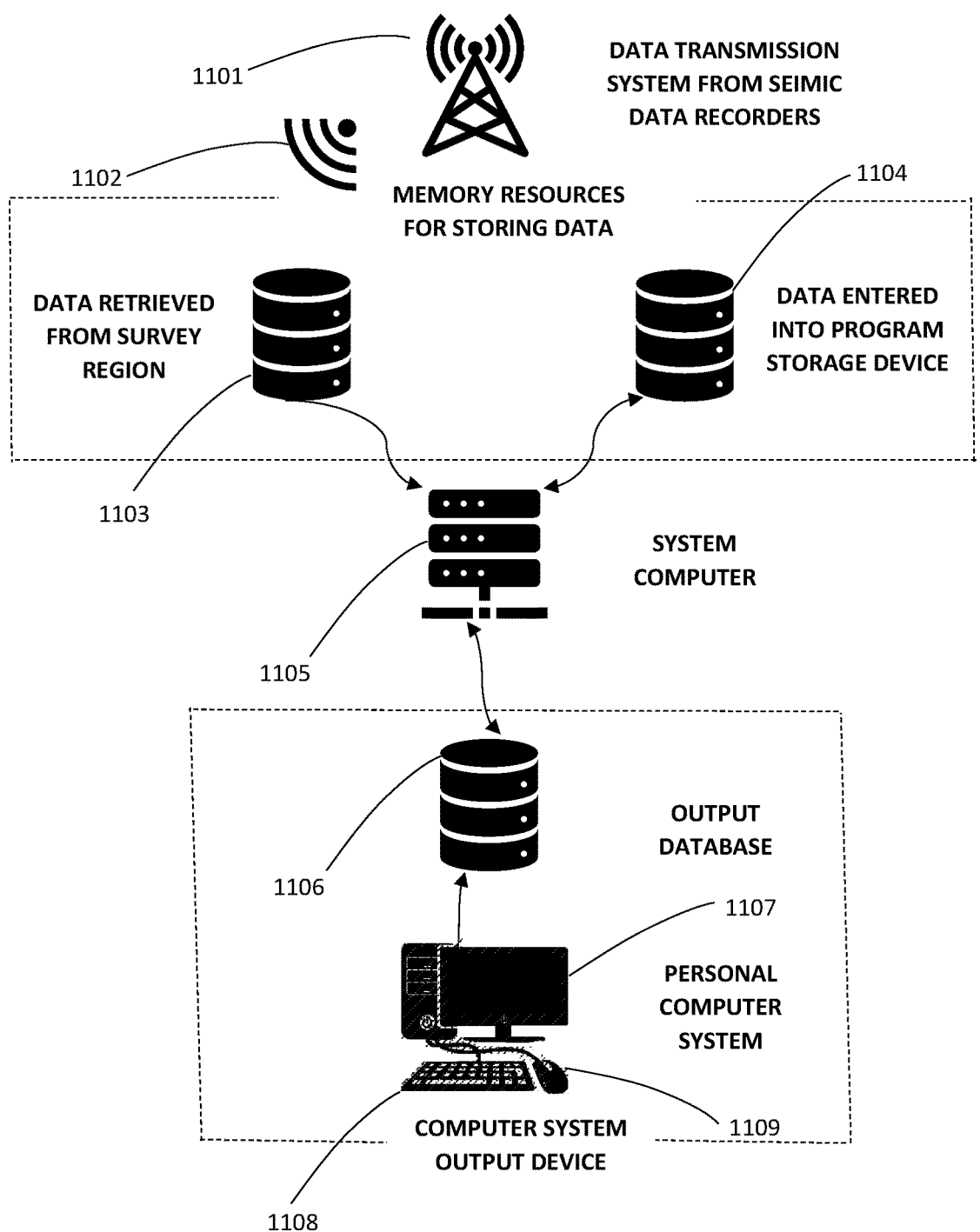
FIG. 11. Is an electric diagram, in block form of the digital high performance computing system performing the computer-implemented method, according to an embodiment of the present disclosure.

Continuing with the computer-implemented method of FIG. 3, in particular the retrieved horizons information data 304, may be remotely transferred onto a database, 1103, for further compilation, such as that contemplated on FIG. 11. Further, data 304 may also be retrieved from database 1103, by system computer 1105. The retrieved horizons information data 304, are typically represented for purposes of the present invention as a layer, a surface, an interface, in the earth, and its manifestation in the seismic data. In its purest form, 304 is unattainable because a person having skills in the art, can rarely know exactly where the horizon is in the subsurface. Yet, the horizons information data 304 comprises a matrix of discrete samples in a three dimensional plan (x,y,z) that can be stored in an ASCII file. As such, a horizon is something that can be unambiguously drawn on a map, and treated like a raster image. Some software tools even call attribute maps horizons, blurring the definition further; and therefore creating it as an artifact of software.

Another set of data gathered by the present invention is seismic velocity, 305. Seismic velocity (both compressional and shear) 305 is a fundamental property of materials, a property that varies with changes in conditions both external (stress, temperature) and internal (fluid saturation, crack density). Monitoring of changes in these external or internal conditions is a goal of geophysical investigations such as earthquake prediction (via stress change monitoring) and reservoir exploitation (via fluid saturation monitoring).

Once all data variables have been retrieved (302, 310, 304, and 305), the computer-implemented method proceeds to execute two sub-routine, using system computer 1105.

The first sub-routine, using system computer 1105, involves generating a set of low frequency models 307 through interpolation based on the earth model data, and the upscaled well log data over various points of incidence 104 for the survey region 101. Sub-routine 307 then outputs, and stores on device 1104, a set of low frequency models 309, better exemplified by FIG. 7B. In tandem, sub-routine 306 is performed, which involves generating a set of angle dependent wavelets 308 (exemplified by FIG. 7C) from a plurality of angles of incidence 208 for the survey region 101, by computing a well-to-seismic-tie approach 605 to the set of angle image gathers 312, and the upscaled well log data 302.

Figure 5:
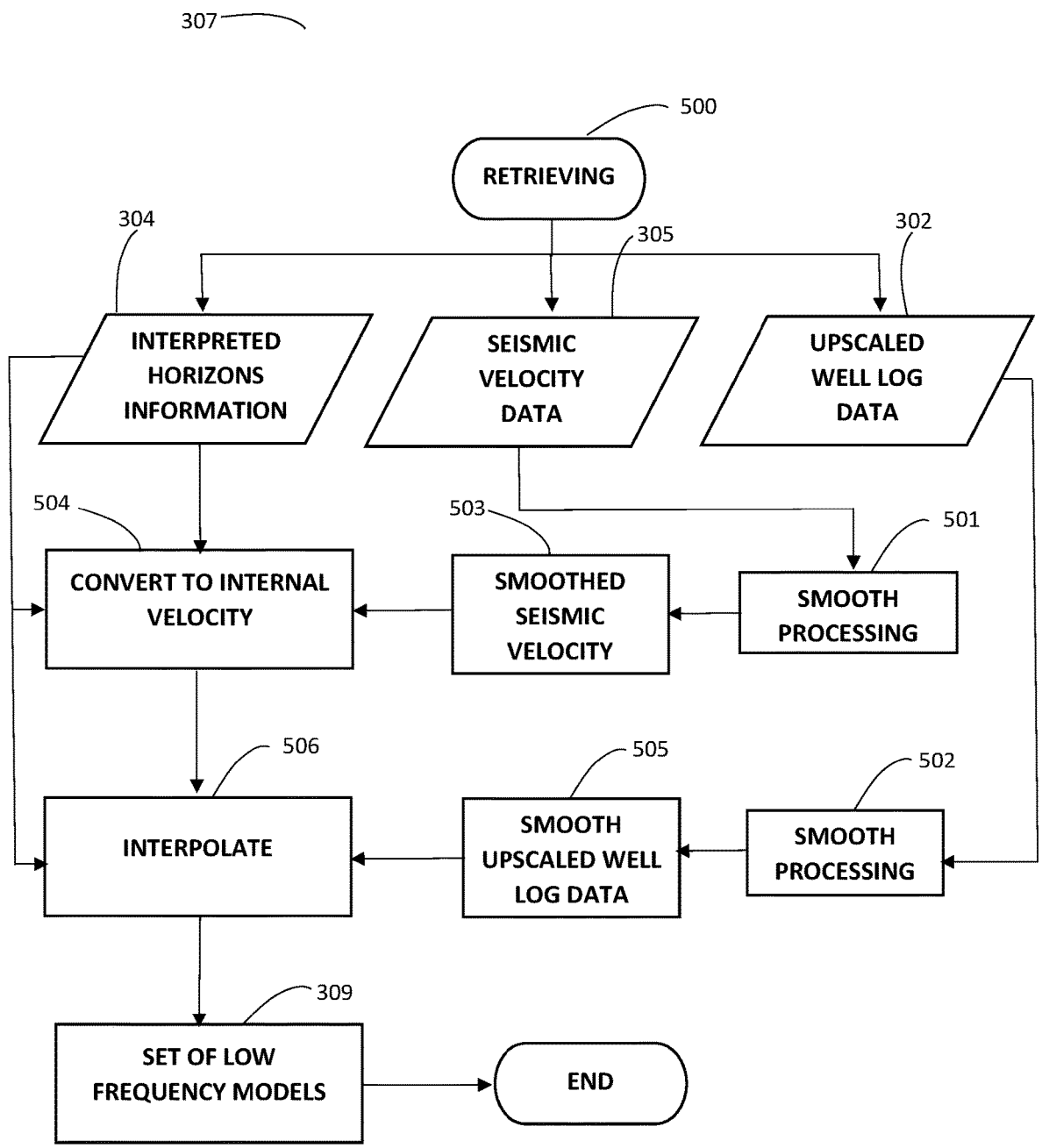
FIG. 5. Is a flow chart showing the operation of generating a set of low frequency models, according to an embodiment of the present disclosure.

In connection with the first-subroutine of generating a set of low frequency models 307, FIG. 5 describes it further. Performing another retrieving operation, 500, of the upscaled well log data which is represented in time domain 302, in combination with the interpreted horizons information data 304, and the seismic velocity data 305, the present invention generates a set of low frequency models (further illustrated by FIG. 7B), using interpolation process, 506, based also on 302 and 305, over various points of incidence 204 for the survey region 101. However, due to the fact that the retrieved seismic data from geo-sensors 206, like those depicted in the present invention are bandlimited, the retrieved information lacks the low frequencies that are essential for a relative-to-absolute property conversion. These unfiltered or noisy set of low frequency models can be regarded as the mean trend of the data and the higher frequencies are the deviation from that mean trend. As such, the present invention filters or smooths-out 302 and 305, to generate a set low frequency models FIG. 7B that are a critical step for the present invention as they are used to account for missing information below the seismic data. Further, the present invention solves the problem of how to go about interpolating the logs between the different points of incidence 205.

Because interpreters are usually uncertain about how to obtain a set of low frequency models like FIG. 7B, and often uncomfortable with the results, the present invention discloses a method that is compatible with the preferred embodiment of the present invention and produces better results. To achieve said better results, the present invention discloses the steps of generating a set of low frequency models that further comprise digitally smoothing 501 the retrieved seismic velocity data 305, and digitally smoothing 502 the upscaled well log data 302, by running the retrieved data over a set of low pass filters. This filtering computes an amplitude spectrum to meet specifications in the frequency domain, thereby cutting out high frequencies and significantly reducing the noise from retrieved upscaled log well data 302, as well as that of the retrieved seismic velocity 305. Once the seismic velocity 305 has been smoothed to 503, it is then converted to internal velocity data 504, using the retrieved interpreted horizons information 304 and following the Dix transform inversion method (Durbaum, 1954; and Dix, 1955). Said method relies primarily in computing interval velocities from picked root mean squares (rms), or stacking, velocities, and corresponding travel times by the well-known formula of:

$$\widetilde{V_{int}^t} = \sqrt{\frac{V_{rms,i}^2 t_i - V_{rms,i-1}^2 t_{i-1}}{\Delta t_i}} \quad (36)$$

where $\widetilde{V_{int}^t}$ is the local internal interval velocity over the time interval $\Delta t_i = t_i - t_{i-1}$, where i is an iterator starting from 1 to nth-value. Parameters $V_{rms,i}^2$ and $V_{rms,i-1}^2$ are rms velocities at the top and bottom interfaces of the interval. Instantaneous velocity $V_{int}^i$ is assumed as a piecewise constant, $V_{int}^i = \widetilde{V_{int}^t}$, with discontinuities at the interfaces.

The converted internal velocity 504, is then combined with the interpreted horizons information 304, and the smoothed upscaled well log data 505 to perform the step of interpolation 506. Step 506 is performed due to the fact that data, even after going through a smoothening process, the input data is still noisy and requires further refinement. As such, the present computer-implemented method uses an interpolation method known in the art as cokriging. The special characteristic of this method, and why it is of relevant use in the present invention, is because it can utilize data of different nature to model, optimize and interpolate particular attributes. In general terms, the computer-implemented method of the present invention applies an algorithm to an interpolated program coded to accept s set of variables (as oppose to just 2 sets found on typical cokriging algorithms) producing a linear system following the equation of:

$$\begin{pmatrix} C & E \\ E^T & 0 \end{pmatrix} \begin{pmatrix} T \\ \mu \end{pmatrix} = \begin{pmatrix} C_0 \\ I_0 \end{pmatrix} \quad (37)$$

where C is the covariance (or its estimate) matrix of all know variables' pair, and $C_0$ is the vector of pairwise covariances between the unknown variable and all other variables.
where, $\mu$ is the vector of all LaGrange multiples $\mu_1 \ldots \mu_s$.
E is a vector of matrices of $I_1 \ldots I_s$. Each matrix $I_i$, $i \in \{1 \ldots s\}$ is of size (number of points in $i^{th}$ variable set)×s. All elements in the $i^{th}$ column of $I_i$, are one and all other entries are zero.
where, T is the vector of all coefficients, and $I_0$ is a column vector of size s×1 of all elements under $C_0$ on the right-hand side of the equation.

Once the computer-implemented method has interpolated all variables for 304, 504, and 505 following the above algorithm, it generates a set of low frequency models 309 comprising of various individual low frequency models, of the same amount as there were angle image gathers.

Figure 6:
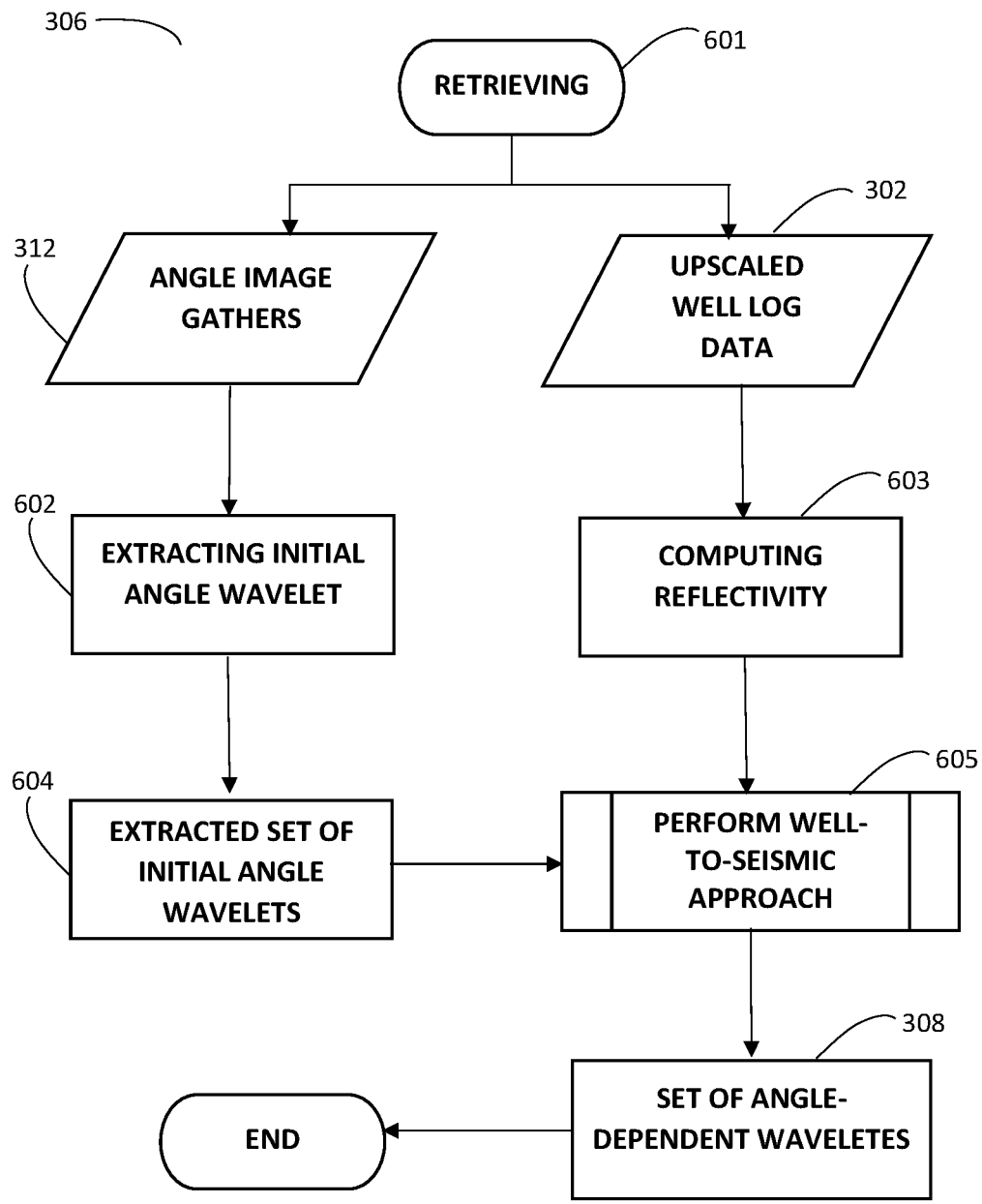
FIG. 6. Is a flow diagram illustrating an operation of generating a set of angle wavelets, according to an embodiment of the present disclosure.

Similarly, sub-routine 306 involves the steps of generating a set of angle wavelets (illustrated on FIG. 7C), using system computer 1105, from a plurality of angles of incidence 208 over the survey region 101, and is represented by FIG. 6. The steps required to fully execute this subroutine further involve retrieving 601 the set of angle image gathers 310, and the upscaled well log data 302. An initial set of angle wavelets 602 is then extracted from the retrieved angle image gathers 312, which acts as an initial estimate of what a final angle dependent wavelet should look like. The extraction is computed within the present invention, using statistical wavelet extraction procedures which use the seismic traces alone to extract the angle dependent wavelets 604. However, in order to extract each angle wavelet 604, the corresponding trace in the set of angle image gathers 310 is used. Then an analysis window is extracted, and the start and end of the extracted analysis window are tapered in lengths equal to the lesser of 10 samples, or ¼ of the analysis window. An autocorrelation process is computed in a data window, wherein the length of the autocorrelation is equal to ½ of the desire wavelength. The amplitude spectrum of the autocorrelation is computed, and the square root of the autocorrelation is calculated. This operation is performed to approximate the amplitude spectrum of the wavelet. Thereafter, the desired phase (e.g. 0°, 5°, 10°, 15°, etc.) is added, and the inverse Fast Fourier Transform (FFT) is computed at 602 by 1105 to produce or extract the initial angle wavelet 604. The extraction procedure 602 verifies if there were other wavelets produced before, and generates the initial wavelet. If other wavelets were created, the new wavelet is generated next to the previously generated wavelet from other traces of the same angle image gathers 312. The extraction procedure continues until all angles from the angle image gathers 312 have been analyzed. Once all angle wavelets have been statistically extracted, an extracted set of initial angle wavelets is generated 604.

According to the preferred embodiment of the invention, the next step in sub-routine 306 is computing angle dependent reflectivity 603 using the quadratic approximation of equation (38) that combines the angles of incidence 208 represented by $\theta_i$, with respect to the: (a) upscaled well log data 302 (b) P-wave velocity represented as $\alpha$, (c) S-wave velocity represented as $\beta$ (d) the Poisson impedance represented as PI, and (e) the density represented as $\rho$, over the survey region 101.

$$R_{PP}(\theta_i) = \left[\frac{1}{2}\sec^2\theta_i - \frac{4}{c}\left(\frac{\beta}{\alpha}\right)\sin^2\theta_i\right]\frac{\Delta\alpha}{\alpha} + \left[\frac{4}{c}\left(\frac{\beta}{\alpha}\right) - 4\left(\frac{\beta}{\alpha}\right)^2\right] \quad (38)$$

$$\sin^2\theta_i \frac{\Delta PI}{PI} + \left[\frac{1}{2} - \frac{4}{c}\left(\frac{\beta}{\alpha}\right)\sin^2\theta_i + 2\left(\frac{\beta}{\alpha}\right)^2\sin^2\theta_i\right]\frac{\Delta\rho}{\rho} +$$

$$\left[\frac{2}{c}\frac{\Delta\alpha}{\alpha} - \left(\frac{2}{c} - 2\frac{\beta}{\alpha}\right)\frac{\Delta PI}{PI} + \left(\frac{2}{c} - \frac{\beta}{\alpha}\right)\frac{\Delta\rho}{\rho}\right]^2 \frac{\beta}{\alpha}\cos\theta\sin^2\theta_i$$

Next, by performing a well-to-seismic approach 605 (graphically illustrated in FIG. 8) to the extracted initial set of angle wavelets 604 for the survey region, a set of angle-dependent wavelets 308 is generated, and stored on device 1104. Said set of angle-dependent wavelets is further exemplify in FIG. 7A.

According to the preferred embodiment of the invention, once the set of angle image gathers 310, the set of angle wavelets 308, and the set of low frequency models 309 are generated, process 311 is next performed. This process combines the three different sets of data as a precursor to sub-routine 312, using system computer 1105 and storing them in device 1104.

Figure 12:
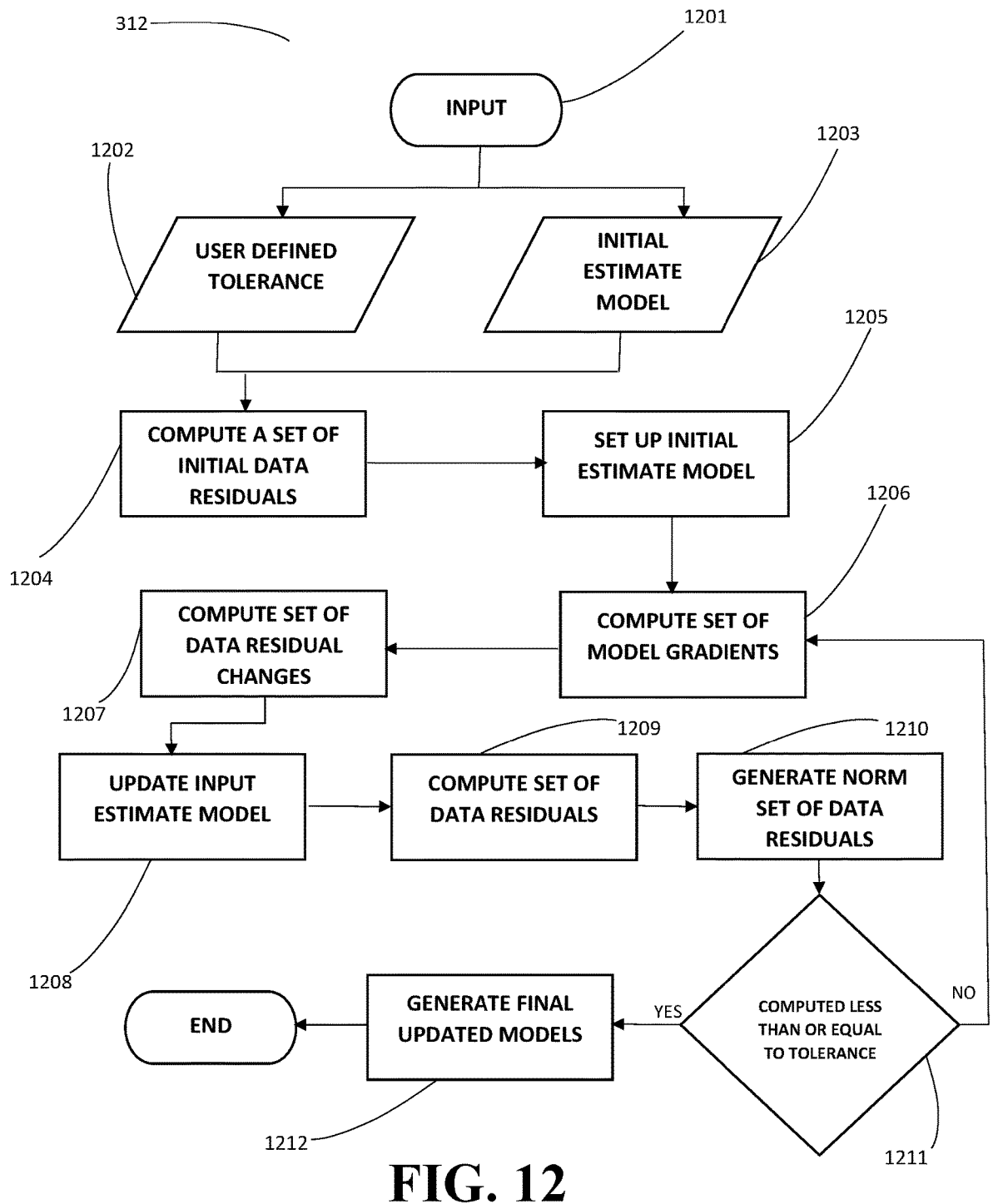
FIG. 12. Is a flow chart showing the sub-routine of generating a nonlinear direct prestack seismic inversion model as performed by the system computer of the high performance digital computing system, according to an embodiment of the present disclosure.

Sub-routine 312 (illustrated in FIG. 12) it is then initiated by a user inputting 1201 through a combination of user input devices like 1108 (keyboard), and 1109 (mouse) a user defined tolerance value 1202; that a person having ordinary skills in the art would understand it to be less than 1 (i.e. $10^{-6}$). The user also inputs an initial estimate model 1203 comprising of variable $m_0$, which persons of ordinary skill in the art also regard it as an initial model prediction. Both inputs are then sent from a user computer system to be stored in database device 1104 for processing by system computer 1105 following step 1204. Process 1204 computes a set of initial data residuals using the initial estimate model 1203, and the user defined tolerance value 1202. In geophysics term, a data residual is made by the difference between a measured data and predicted data. During this process, the computed initial data residuals are calculated using the following expression, which contemplates that those skilled in the art will readily recognize it as a term derived from other known data residual expression for computing the data residuals between observed data and predicted data:

$$r = d - Wf(m_0) \quad (39)$$

Thereafter, the computer-implemented method of the present invention begins preparing the system computer 1105 to run a system of loops, in order to obtain the final non-linear direct prestack seismic inversion 313. However, a user must first set up the initial estimate model 1205 in the personal computer from value $m_0$ to $m_i$. This is interim computing step, messages the system computer 1105 that model $m_i$, as defined in the system computer 1154, will get reiterated until a certain requirement has been met. According to the preferred embodiment of the present invention, i in expression $m_i$ is an iterator stored in device 1104, used as a pointer by system computer 1105, for abstracting addresses of elements of different structures, in other words multiple linear objects. As a result, i allows data structures to interface with algorithms of the present invention, that aren't aware of the structure they are operation on. Further, said iterator is used by system computer 1105 to generate a new iterator, based on the iterator that it is currently available, and upon passing it through the various required process (see 1206, 1207, 1208, 1209 and 1210) it returns the next iterator in the sequence in for the model variable m.

As all the values have inputted into system computer 1105, as well as the initial data residuals 1204 already computed; a set of model gradients is then computed, 1206, using expression:

$$g(m_i) = \frac{\partial}{\partial m^T} J(m_i) = F^T W^T C_e^{-1} r + C_m^{-1} m_i + C_p^{-1}(m_i - \hat{m}) + C_\ell^{-1} \mathcal{L}(m_i) \quad (40)$$

The digital computing system of FIG. 11, using system computer 1105 then computes a set of data residuals changes 1207 for the linear and non-linear reflectivities of the approximation to the Zoeppritz equation which further comprises the expression:

$$\Delta r = WFg(m_i) \quad (41)$$

According to the preferred embodiment of the invention, the process of updating the input estimate model 1208 is performed by system computer 1105 which calculates the changes from any previous model (i.e. $m_0$) to the current model ($m_i$), and adds it to the current model. An updated input model $m_{i+1}$ is then generated and the iterator gets a value of one added.

The step of computing the data residuals 1209 using expression $r = d - Wf(m_{i+1})$ is performed next. With step 1209 completed, system computer 1105 generates a matrix norm 1210 for the computed data residuals 1209. System computer 1105 then performs a series of iterations 1211, using the norm computed data residuals 1209 with the inputted user defined tolerance value 1202, until it confirms that the computed data residual 1209 is less than the tolerance value 1202. Once system computer 1209 confirms such inequality, the iteration process 1211 is concluded and the inverted results, in the form of a final set of updated models is generated, 1212, and outputted onto storage device 1106, alongside the entire set of data generated during sub-routine 312. A user may then retrieve the data using a personal computer 1107 by selecting an export function.

With sub-routine 312 concluded, the computer-implemented method of the present invention illustrated in FIG. 3 performs iteration 313, wherein it repeats the steps of combining the set of low frequency models 309 with the set of angle dependent wavelets 308, until all gathers from the set of angle image gathers 310, and all corresponding low frequency models from the set of low frequency models 309 have been combined to the set of angle wavelets 308. System computer 1105 then verifies that the repeating step performed a final nonlinear direct prestack seismic inversion model, in other words, there are no more final angle image gathers (from the set of angle image gathers), to combine with corresponding final low frequency models (from the set of low frequency models) to the set of angle wavelets. If the system computer 1105 verifies 313 that the entirety set of models have been combined, it produces a final model of elastic properties, 314, as shown on FIG. 10. If the system computer 1105 is not able to verify 313 that it is ready to produce a final model of elastic properties 314, it will initiate again the step of combining all set of models and data, as well as sub-routine 312, until it is able to produce the final model of elastic properties 313, which will then get outputted by system computer 1105 onto storage device 1106. The user of personal computer 1107 may then retrieved and display the final model of elastic properties 314 for further analysis or recommendations.

For any of the foregoing embodiments, the computer system 1107 may include any of the following elements, alone or in combination with each other. The functions performed by the system computer 1105 include functions to input, retrieve, convert, combine, generate, produce, calibrate, perform, extract, filter, and output; an array of different values, including well log data, horizons information, seismic velocity, P-wave velocity, Poisson Impedance, density, reflectivity, angle image gathers, low frequency models, angle dependent wavelets, as well as more complex functions like performing the nonlinear direct prestack seismic inversion model of the present invention based upon information related, and obtained from, survey region containing at least one well location and wellbore penetrating the subterranean earth formation.

Figure 8:
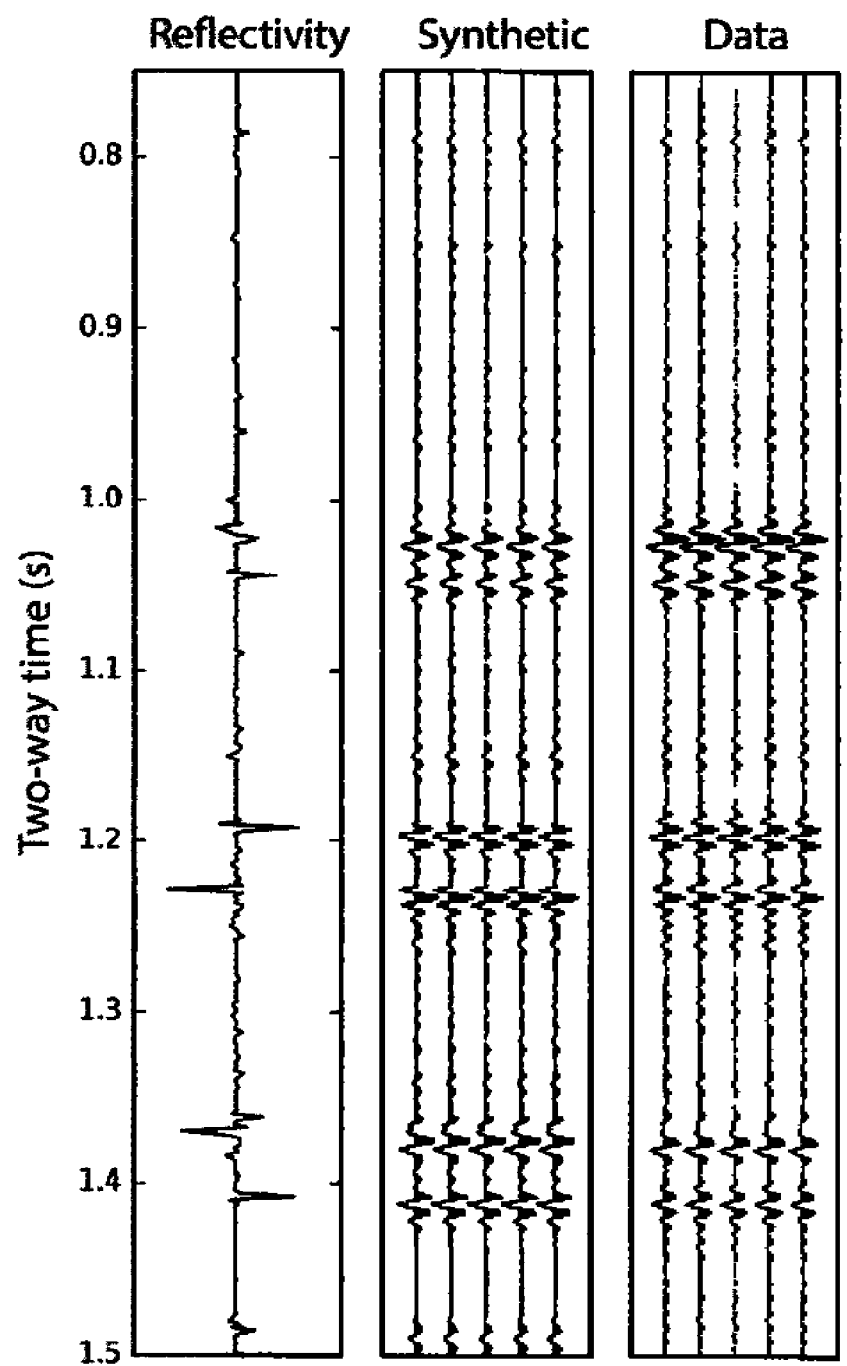
FIG. 8. Illustrates in graphic representation, the test results of a well-to-seismic approach for comparing the synthetic to measured seismic data at well location, according to an embodiment of the present disclosure.

Turning over to FIG. 7, it illustrates in graphical form, the different sets of data (310, 308, and 309) generated as an output of the aforementioned sub-routines (303, 306, and 307). Similarly, FIG. 8 illustrates in graphical form the process of performing a well-to-tie approach by comparing synthetic seismogram to survey seismic data using angle-dependent wavelets, and a computed angle-dependent reflectivity.

Figure 9A:
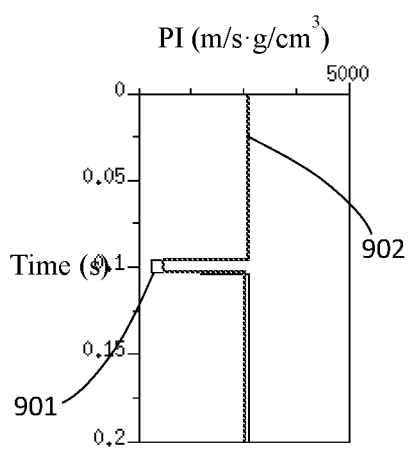
FIG. 9. Illustrates in graphic representation, a comparison between the inverted Poisson impedance (PI) using the present computer-implemented method and system illustrated in FIG. 9A, versus the indirect Aki-Richards approximation, illustrated in FIG. 9B, according to an embodiment of the present disclosure.
Figure 9B:
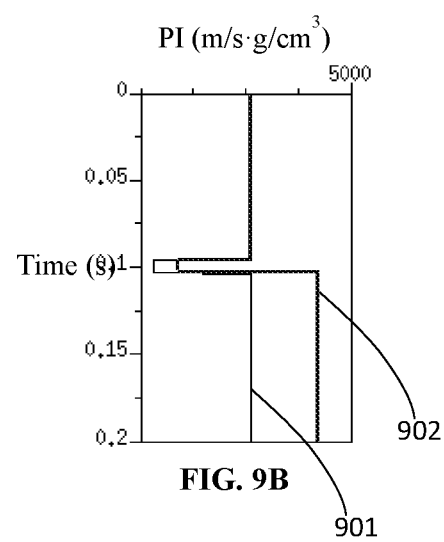

In FIG. 9, the graphical representation shows a comparison between the results using the computer-implemented method of the present invention, employing nonlinear direct prestack seismic inversion for Poisson (PI) impedance, illustrated by FIG. 9A, against another computer-implemented method employing the indirect Aki-Richards approximation, illustrated by FIG. 9B. On both graphic representations, line 901 represents the true model, and line 902 represents the results obtained from each computer-implemented method. Clearly, graphical representation of FIG. 9A shows more accurate results than FIG. 9B as represented by gap created by the differences between line 901 and line 902.

Figures 10A, 10B, 10C:
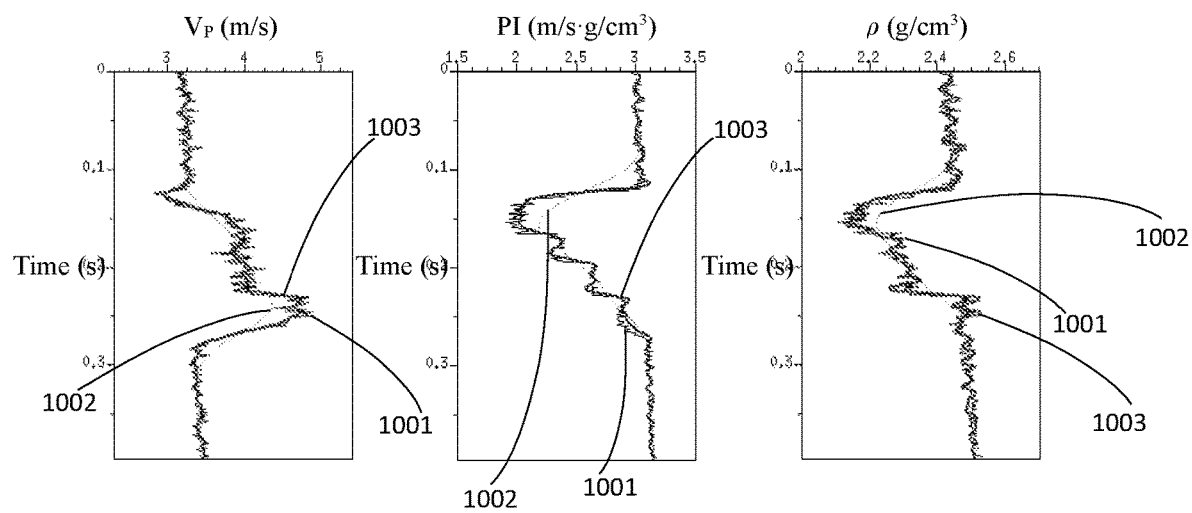
FIG. 10A shows the P-wave velocity.
FIG. 10B shows the Poisson impedance.
FIG. 10C shows the density, according to an embodiment of the present disclosure.

In FIG. 10 the graphical representation of the computer-implemented final model of elastic properties 315 is shown. When dividing up the parameters according to their individual representations, FIG. 10A shows the P-wave velocity, FIG. 10B shows the Poisson impedance, and FIG. 10C shows the density. The 1001 lines represent the true parameters, the 1002 lines represent the initial parameters, and the 1003 lines represent the parameters as produced in the final model of elastic properties 315 by the present invention. As expected, the parameters produced by the present invention, match well with the true ones in velocity, Poisson impedance, and density.

As used herein, the term "computing" encompasses a wide variety of actions, including calculating, determining, processing, deriving, investigation, look ups (e.g. looking up in a table, a database or another data structure), ascertaining and the like. It may also include receiving (e.g. receiving information), accessing (e.g. accessing data in a memory) and the like. Also, "computing" may include resolving, selecting, choosing, establishing, and the like.

According the preferred embodiment of the present invention, certain hardware, and software descriptions were detailed, merely as example embodiments and are not to limit the structure of implementation of the disclosed embodiments. For example, although many internal, and external components of the computer system of FIG. 12 have been described, those with ordinary skills in the art will appreciate that such components and their interconnection are well known. Additionally, certain aspects of the disclosed invention may be embodied in software that is executed using one or more processing units as 1105. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

Additionally, the flowcharts and block diagrams in the Figures illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

Symbols Table

| Symbol | Brief Definition |
| --- | --- |
| $R_{PP}$ | P-wave reflection coefficient on a horizontally elastic interface |
| $R_{PP}(p)$ | P-wave reflection coefficient as a function of ray parameter |
| $R_{PP}(\theta)$ | P-wave reflection coefficient as a function of angle of incidence |
| $R_f$ | Fluid-to-fluid reflection coefficient on a horizontally acoustic interface |
| p | Ray parameter |
| q | Vertical slowness as a function of velocity and ray parameter |
| $\alpha$ | P-wave velocity |
| $\beta$ | S-wave velocity |
| $\rho$ | Density |
| $\mu$ | Shear moduli |
| PI | Poisson impedance |
| $\Delta \alpha$ | Contrast in P-wave velocity across a horizontally elastic interface |
| $\Delta \beta$ | Contrast in S-wave velocity across a horizontally elastic interface |
| $\Delta \rho$ | Contrast in density across a horizontally elastic interface |
| $\Delta \mu$ | Contrast in shear moduli across a horizontally elastic interface |
| $\Delta PI$ | Contrast in Poisson impedance across a horizontally elastic interface |
| $\theta$ | Angle, Angle of incidence between the reflecting ray and the vertical |
| c | Rotation optimization factor of Poisson impedance |
| $\bar{R}_{PP}$ | Linear reflectivity of the approximation to the Zoeppritz equation |
| $\tilde{R}_{PP}$ | Nonlinear reflectivity of the approximation to the Zoeppritz equation |
| A, B, C, D, E, F, G and $\Psi$ | Other variables used for formula derivation |
| $m_\alpha$ | Model vector of elastic parameter reflectivity for P-wave velocity |
| $m_{PI}$ | Model vector of elastic parameter reflectivity for S-wave velocity |
| $m_\rho$ | Model vector of elastic parameter reflectivity for density |
| m | Model vector of three elastic parameter reflectivities |
| $m_0$ | Initial model vector for three elastic parameter reflectivities |
| $\hat{m}$ | Low frequency trend model vector from well-logging or stacking velocity |
| $\Delta m$ | Model perturbation vector between actual model and initial model |
| $\bar{r}$ | Linear reflectivity vector for $\bar{R}_{PP}$ |
| $\tilde{r}$ | Nonlinear reflectivity vector for $\tilde{R}_{PP}$ |
| d | Observed seismic data vector |
| e | Vector containing noise |
| W | Given wavelet as a function of angle of incidence |
| f | Nonlinear forward modeling operator that predicts data from model |
| F | Fréchet derivatives indicating the sensitivity of data to model perturbation |
| C | Covariance matrix |
| $\partial d/\partial m$ | Matrix of partial derivatives of data vector with respect to model vector |
| J (m) | Objective function as a function of model vector |
| g (m) | Model gradient as a function of model vector |
| r | Data residual between observed data and predicted data |
| A, B, C, D and $\Psi$ | Other matrices used for formula derivation |

What is claimed is:

1. A computer-implemented method for estimating Poisson impedance in a survey region having at least one well location and for generating a final model of elastic properties of the survey region, the method comprising:
- positioning seismic data recording sensors in the survey region at different locations including a wellbore;
- blasting at points of incidence in the survey region;
- retrieving, using the seismic data recording sensors, seismic data and transmitting the seismic data to a database;
- retrieving, by a computer, an upscaled well log data represented in time domain, including compressional velocity, shear velocity, and density data over various points of incidence in the survey region from the database;
- retrieving, by the computer, a set of angle image gathers, preconditioned to preserve a signal amplitude information of various angles of incidence for the survey region from the database;
- retrieving, by the computer, an earth model data that includes horizons information data for the survey region from the database;
- retrieving, by the computer, seismic velocity data over time for the survey region from the database;
- generating, by the computer, a set of low frequency models through interpolation based on the earth model data, and the upscaled well log data over various points of incidence for the survey region which are retrieved from the database;
- generating, by the computer, a set of angle dependent wavelets from a plurality of angles of incidence for the survey region which is retrieved from the database, by applying a well-to-seismic-tie calculation to the set of angle image gathers, and the upscaled well log data which is retrieved from the database;
- combining, by the computer, a first angle image gather from the set of angle image gathers, with the corresponding first low frequency model from the set of low frequency models, and to the set of angle wavelets;
- executing, by the computer, a nonlinear direct prestack seismic inversion model by employing the combined first angle image gather, with the first low frequency model, and the set of angle wavelets;
- repeating the combining using another angle image gather from the set of angle image gathers with the corresponding first low frequency model and the executing a nonlinear direct prestack seismic inversion model operations for the survey region until all gathers from the set of angle image gathers, and all corresponding low frequency models from the set of low frequency models have been combined to the set of angle wavelets;
- verifying that the repeating operation executed a final nonlinear direct prestack seismic inversion model by combining a final angle image gather from the set of angle image gathers, with a corresponding final low frequency model from the set of low frequency models to the set of angle wavelets; and
- generating a final model of elastic properties from the results of said nonlinear direct prestack seismic inversion model in the survey region by calculating the exponential integration of the elastic reflectiveness to characterize the survey region.

2. The computer-implemented method of claim 1, wherein the retrieving, by the computer, the set of angle image gathers includes:
- retrieving seismic survey data for the survey region;
- retrieving seismic velocity data for the survey region;
- executing a prestack time migration calculation using the retrieved seismic survey data, and the retrieved seismic velocity data for the survey region;
- generating offset image gathers;
- stacking the retrieved offset image gathers over time at various offsets of incidence;
- converting the offset image gathers to angle image gathers; and
- calculating the set of angle image gathers.

3. The computer-implemented method of claim 1, wherein the generating, by the computer, the set of low frequency models further includes:
- retrieving seismic velocity data for the survey region;
- retrieving interpreted horizons information from an earth-model data for the survey region;
- retrieving the upscaled well log data represented in time domain including compressional velocity, shear velocity, and density data over various points of incidence, for the survey region;
- smoothing the retrieved seismic velocity data, and the retrieved upscaled well log data;
- converting from the smoothed seismic velocity data, using the retrieved interpreted horizons information to an interval velocity data;
- interpolating the converted interval velocity data, with the interpreted horizons information, and the smoothed upscaled well log data; and
- generating the set of low frequency models.

4. The computer-implemented method of claim 1, wherein the generating, by the computer, the set of angle dependent wavelets from the plurality of angles of incidence over the survey region includes:
- retrieving angle image gathers for the survey region;
- retrieving upscaled well log data for the survey region;
- extracting an initial set of angle wavelets from the retrieved angle image gathers;
- computing reflectivities represented in time domain, from the retrieved upscaled well log data;
- executing a well-to-seismic calculation to the initial set of angle wavelets for the survey region; and
- generating a set of angle-dependent wavelets.

5. The computer-implemented method of claim 1, wherein the generating, by the computer, the final model of elastic properties includes:
- inverting the elastic reflectiveness of all nonlinear direct prestack seismic inversion models comprising the expression: $d = Wf(m_0) + e$;
- generating volume models for compression velocity, Poisson impedance, and density;
- exporting the volume models to the database; and
- generating the final model of elastic properties.

6. The computer-implemented method of claim 1, wherein the set of low frequency models equal, in quantity, to the same amount of angle image gathers from the set of angle image gathers.

7. A digital computing system, comprising:
- a computer system output device;
- a system computer, coupled to the memory resource and to the computer system output device, comprising at least one memory resource comprising instructions and at least one hardware processor to execute the instructions within the at least one memory resource to implement:
  - receiving seismic survey data from a plurality of seismic data recorders located over a plurality of offset distances from the plurality of points of incidence;

executing the nonlinear direct prestack seismic inversion model of a seismic survey region associated with the plurality of points of incidence with at least one well location;
inputting a user defined tolerance value;
inputting an initial estimate model equal to a user input value, or zero;
computing a set of initial data residuals using the initial estimate model;
setting up the initial estimate model equal to an input estimate model;
computing a set of model gradients;
computing a set of data residual changes;
updating the input estimate model using the set of model gradients, with the set of data residual changes;
computing a set of data residuals using the updated input estimate model;
generating a matrix norm from the computed set of data residuals;
repeating the operations of computing a set of model gradients, computing a set of data residual changes, updating the input estimate model, and computing a set of data residuals until the generated norm equals the user defined tolerance value; and
generating a final set of data residuals.

8. The digital computing system of claim 7, wherein the inputting the initial estimate model further comprises the expression $m_0$.

9. The digital computing system of claim 7, wherein the computing flail the set of initial data residuals further comprises the expression $r=d-Wf(m_0)$.

10. The digital computing system of claim 7, wherein the setting the initial estimate model equal to the input estimate model further comprises the expression $m_0=m_i$.

11. The digital computing system of claim 7, wherein the set of model gradients further comprises the expression:

$$g(m_i) = \frac{\partial}{\partial m^T} J(m_i) = F^T W^T C_e^{-1} r + C_m^{-1} m_i + C_p^{-1}(m_i - \hat{m}) + C_\ell^{-1} \mathcal{L}(m_i).$$

12. The digital computing system of claim 7, wherein the computing the set of residual changes further comprises the expression $\Delta r = WFg(m_i)$.

13. The digital computing system of claim 12, wherein the term F further comprises the expression:

$$F = \frac{\partial d}{\partial m} = \begin{bmatrix} A_1 + 2\Psi^T D_1 \Psi_\alpha & B_1 + 2\Psi^T D_1 \Psi_{PI} & C_1 + 2\Psi^T D_1 \Psi_\rho \\ A_2 + 2\Psi^T D_2 \Psi_\alpha & B_2 + 2\Psi^T D_2 \Psi_{PI} & C_2 + 2\Psi^T D_2 \Psi_\rho \\ \vdots & \vdots & \vdots \\ A_M + 2\Psi^T D_M \Psi_\alpha & B_M + 2\Psi^T D_M \Psi_{PI} & C_M + 2\Psi^T D_M \Psi_\rho \end{bmatrix}.$$

14. The digital computing system of claim 7, wherein the updating of the input estimate model further comprises the expression $m_{i+1} = m_i + \Delta m$.

15. The digital computing system of claim 7, wherein the computing the set of data residuals further comprises the expression $r = d - Wf(m_{i+1})$.

16. The digital computing system of claim 7 wherein the repeating, further increases the iterator i by one every time said operation is executed, until the generated norm is less than or equal to the user defined tolerance values.

\* \* \* \* \*